United States Patent [19]

Kusano et al.

[11] Patent Number: 5,158,506
[45] Date of Patent: Oct. 27, 1992

[54] ICE-CREAM MANUFACTURING APPARATUS AND REFRIGERATION CONTROLLER THEREFOR

[75] Inventors: Tokio Kusano; Takeshi Ishii, both of Gunma, Japan

[73] Assignee: Sanyo Electric Co., Ltd., Osaka, Japan

[21] Appl. No.: 627,198

[22] Filed: Dec. 13, 1990

[30] Foreign Application Priority Data

Dec. 19, 1989 [JP] Japan ................... 1-327187

[51] Int. Cl.$^5$ ............................................. A23G 9/12
[52] U.S. Cl. ................................ 62/136; 62/233; 62/342
[58] Field of Search .................... 62/136, 233, 342

[56] References Cited

U.S. PATENT DOCUMENTS

| | | | |
|---|---|---|---|
| 2,746,260 | 5/1956 | Swenson | 62/233 |
| 2,949,748 | 8/1960 | Gangi | 62/233 X |
| 3,276,633 | 10/1966 | Rahauser | 62/342 X |
| 3,330,129 | 11/1967 | Halverson et al. | 62/342 X |
| 3,608,325 | 9/1971 | Hock | 62/233 X |
| 3,626,709 | 12/1971 | Yuza | 62/136 |
| 4,314,451 | 2/1982 | Leeds et al. | 62/136 X |
| 4,522,041 | 6/1985 | Menzel | 62/342 |

Primary Examiner—William E. Tapolcai
Attorney, Agent, or Firm—Darby & Darby

[57] ABSTRACT

A refrigeration controllere for use with an apparatus for manufacturing soft-ice-cream and the like by beating and refrigerating at a preset temperature an ice-cream mix supplied from a hopper into refrigeration cylinders.

The controller is adapted to monitor refrigeration time and refrigeration temperatures of the refrigeration cylinders and the hopper so that, in case refrigeration time becomes too long due to wrong temperature setting, the preset lower temperature limit is shifted up to correct the wrong temperature setting, thereby permitting a layman to control the apparatus and provide ice-cream having proper softness and at the same time save energy and the life-time of the apparatus.

14 Claims, 38 Drawing Sheets

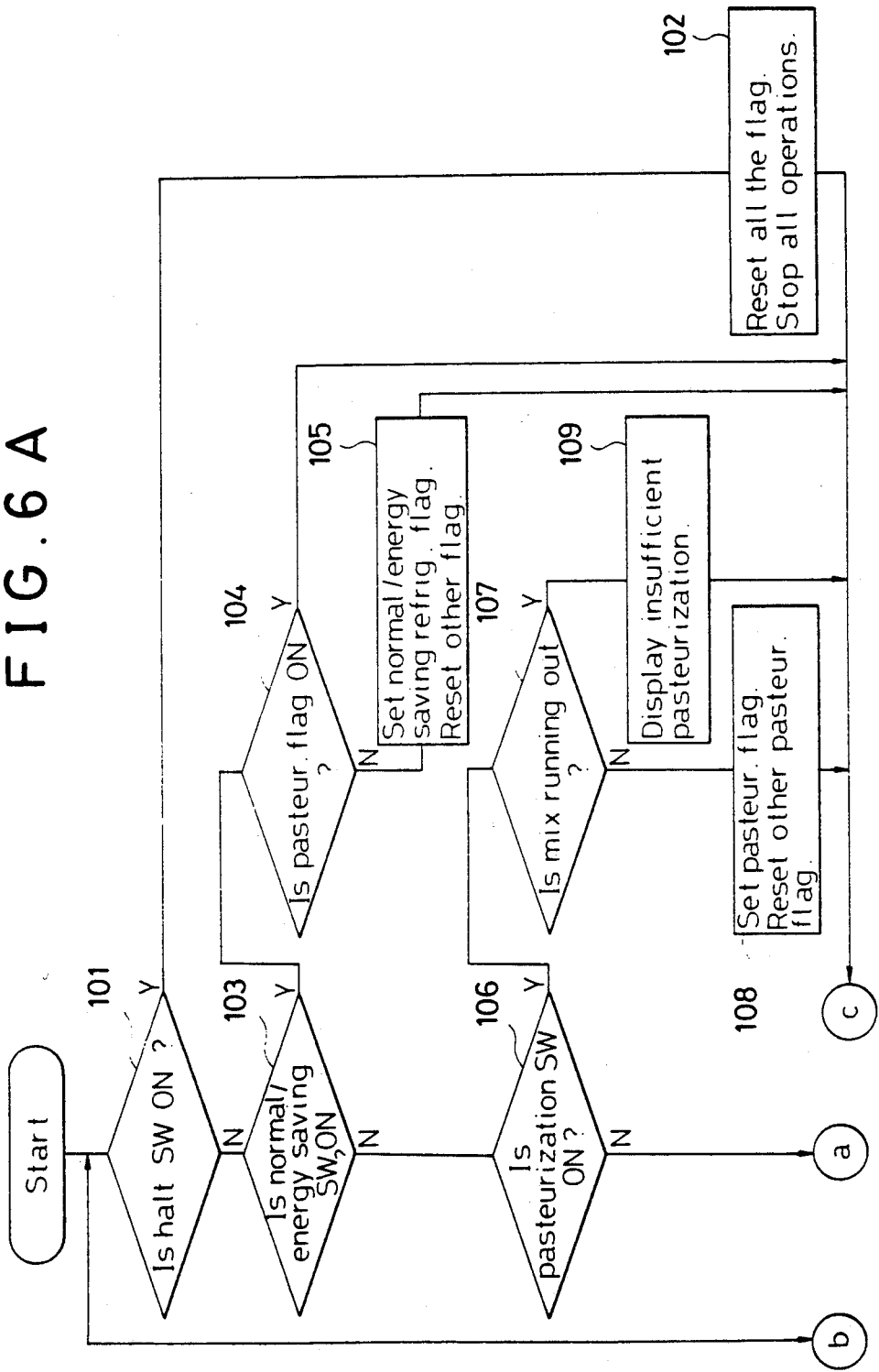

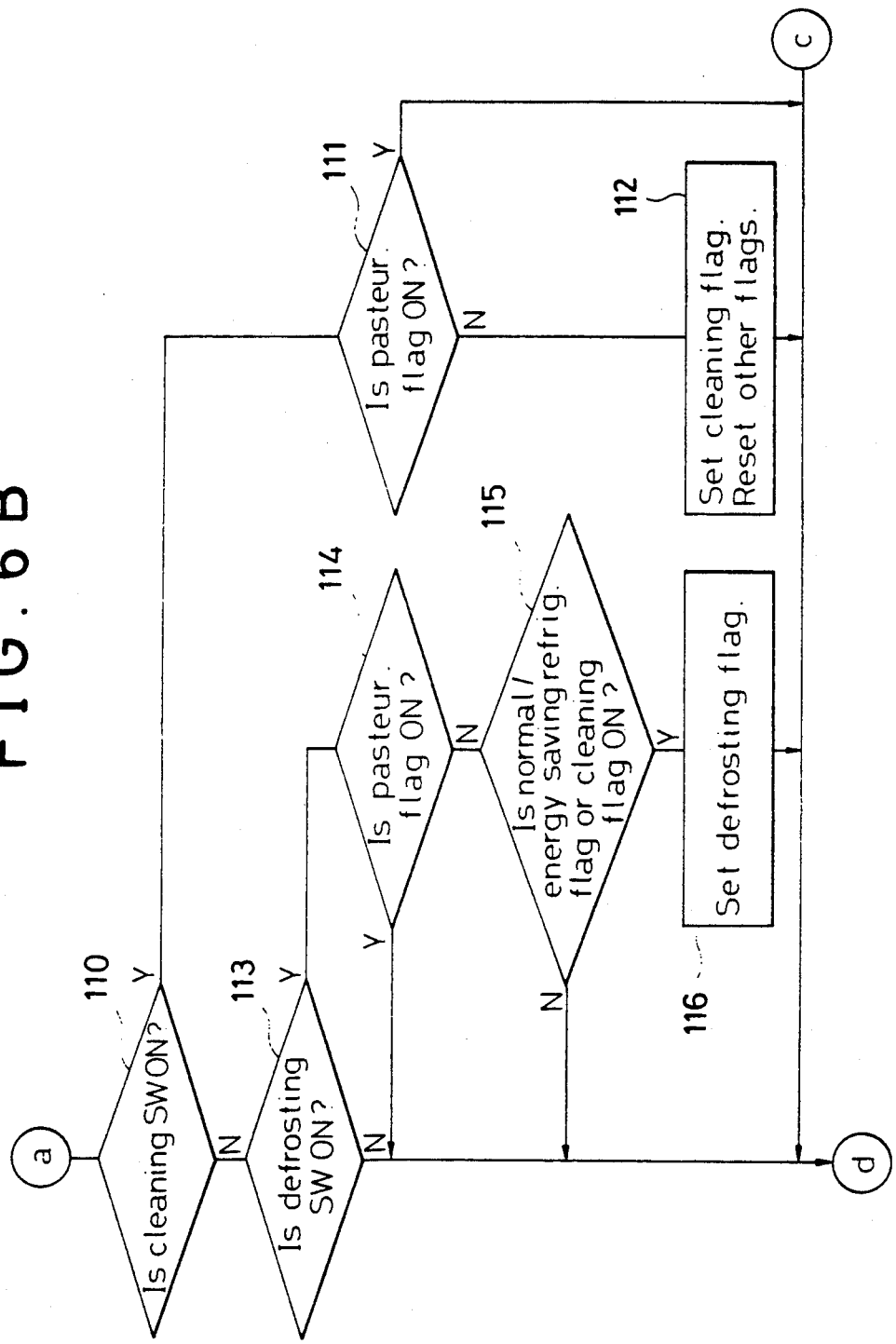

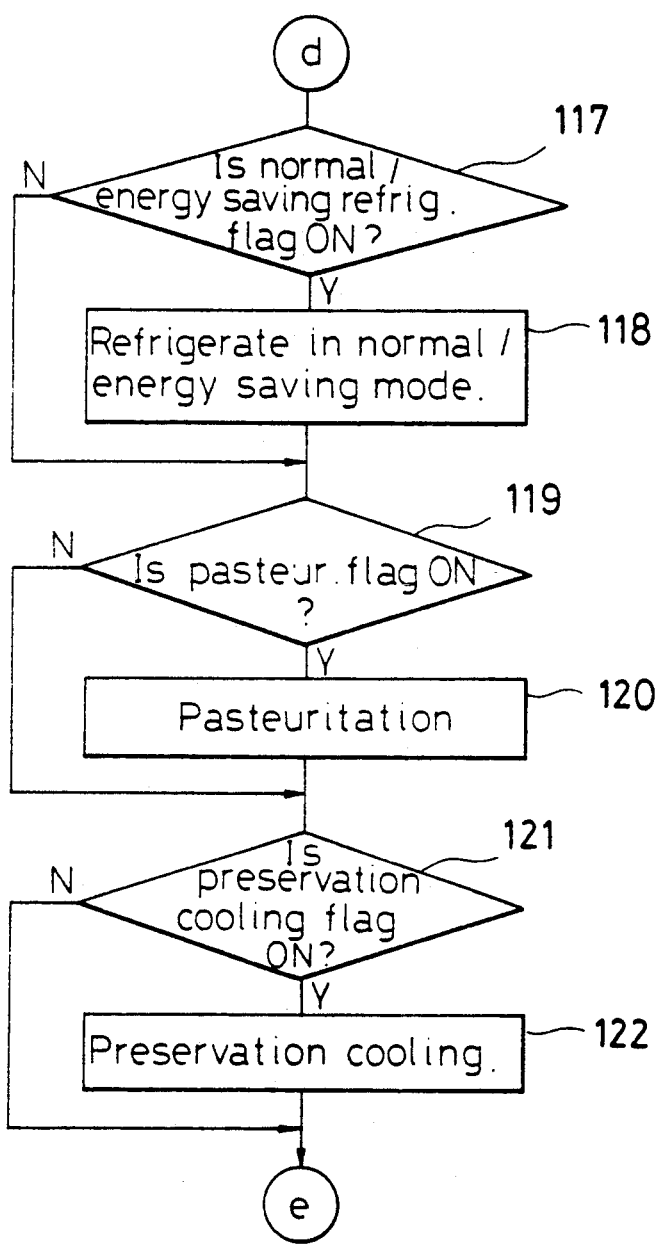

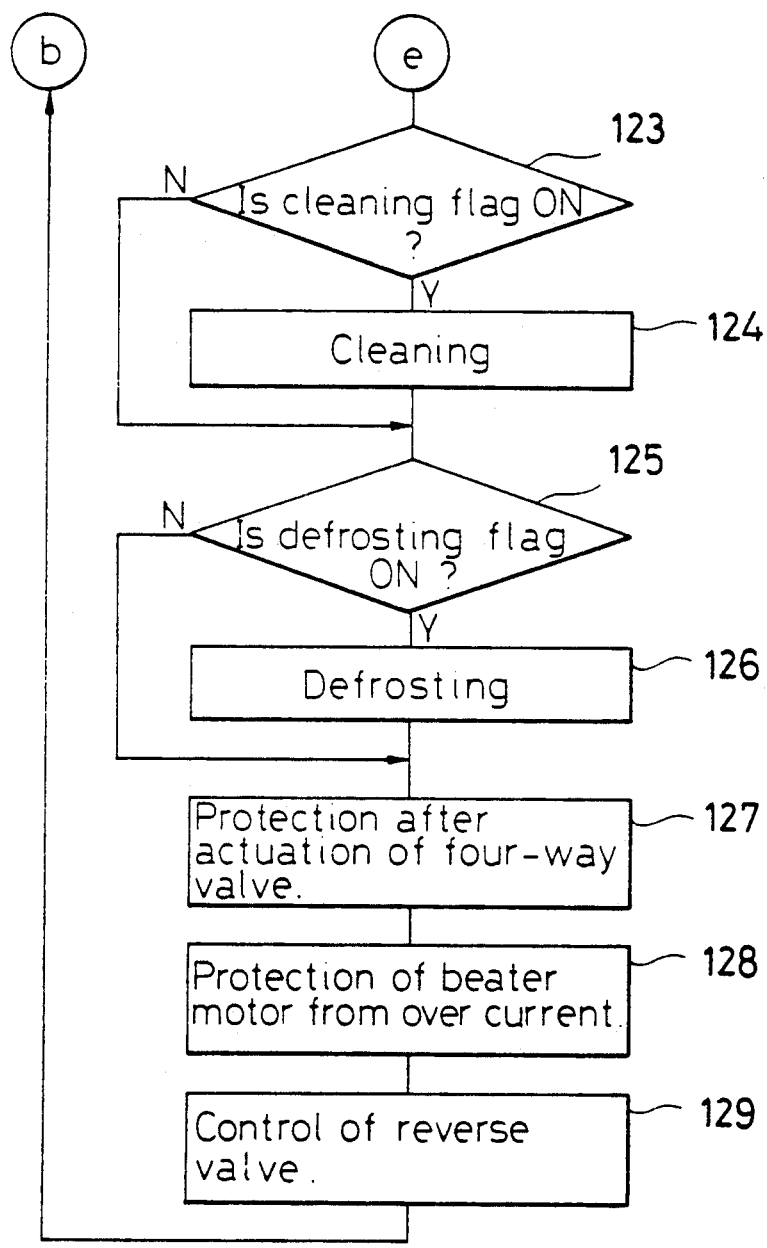

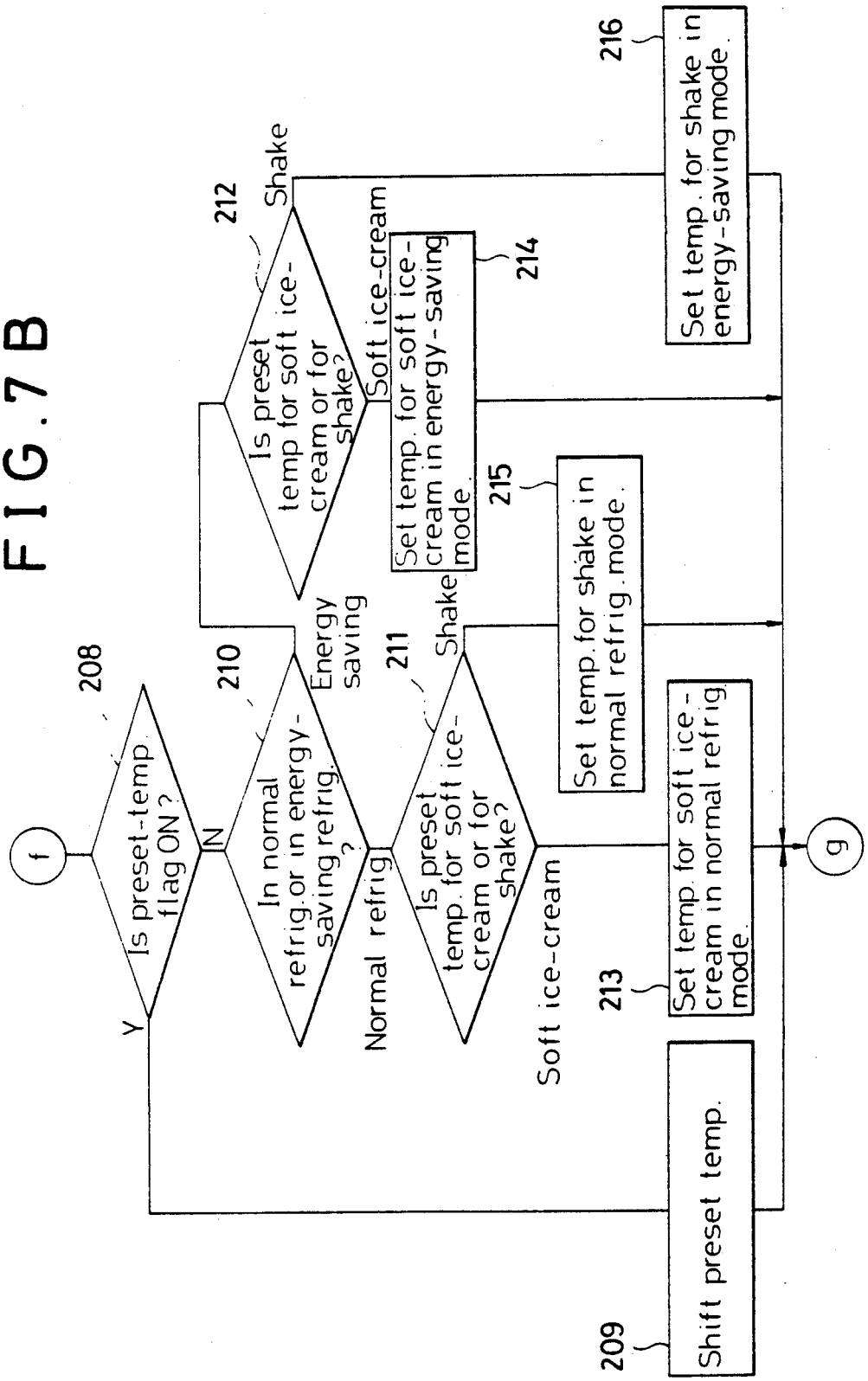

ICE-CREAM MANUFACTURING APPARATUS AND REFRIGERATION CONTROLLER THEREFOR

FIELD OF THE INVENTION

This invention relates to a refrigeration controller for use with an apparatus for manufacturing soft-ice-cream, ice-cream shake and like beverages (which will be generally referred to as ice-creams hereinafter) by beating and refrigerating ice-cream mixes in refrigeration cylinders supplied from hoppers.

BACKGROUND OF THE INVENTION

In order to manufacture ice-cream having proper softness, e.g. soft ice-cream, it is necessary to properly control the temperature of the refrigeration cylinder where a mix is whipped and cooled. Well known types of conventional controllers for such refrigeration are of either temperature-control type or torque control type. For example, Japanese Utility Model Early Publication No. 63-58586 discloses a temperature-control type controller which controls the temperature of the soft ice-cream based on indirectly detected temperature thereof. The temperature is measured from outside the cylinder containing the soft ice-cream, and is controlled by means of a thermostat, which turns off the refrigerator as it detects a preset OFF-temperature and turns on at a higher preset On-temperature, thereby maintaining the temperature of the soft ice-cream in the cylinder within these two temperatures.

The range of such temperatures may be varied so as to meet the temperature requirements for the ice-cream to be made of the mix in the cylinder. Similar approaches to such temperature control include detection of the temperature or the pressure of the refrigerant in the refrigerator.

A torque control, on the other hand, is based on the detection of the torque necessary to stir a properly frozen mix, as disclosed in Japanese Patent Early Publication No. 63-52843. An optimum torque for this purpose may be detected mechanically or electrically by measuring the electric power required by the beater. Through controlled stopping and restarting of the beater, an ice-cream mix of desired softness may be obtained. The range of the torque for such softness control may be varied for different types of ice-cream to be manufactured.

However, the former temperature control is subject to undesirable over-refrigeration caused by fluctuations in the behavior of the thermostat or erroneous temperature setting. This may happen since the stopping of the refrigeration depends on the preset OFF-temperature, and causes the ice-cream to be refrigerated too hard and a waste of electric energy.

On the other hand the latter temperature control based on the torque measurement may result in an excessive beating of the mix, which may destroy the texture of the ice-cream and make the ice-cream "too soft" to serve in a cup with good shape.

Thus, conventional approaches to the control in manufacturing ice-cream are not satisfactory.

As shown in FIG. 18, the period required for freezing or refrigerating the mix generally depends on the temperature of the soft ice-cream to be made, and so does the power to be input to the beater motor on the refrigeration period. It may be seen in this FIG., however, that the temperature of the ice-cream and the beater motor input vary little with refrigeration time after a certain period. This is due to the fact that the ice-cream attains a certain hardness as it is refrigerated, and exhibits an increased beating load which will balance out the refrigeration power input.

As mentioned above, ice-cream will become too soft under excessive beating. Consequently, refrigeration must be controlled so as not to be given continuously over a long period. This implies that the temperature control or torque control must be given in such a way as to permit intermittent refrigeration, which may be easily attained for a particular ice-cream if the range of the control temperature or torque is narrowed. However, since an ice-cream manufacturing apparatus must be designed for use with different kinds of ice-creams, the temperature or the torque cannot be limited in a narrow range. As a result if the temperature preset by the user is not appropriate, continuous or excessive beating may result and extremely degrade the ice-cream.

There have been known so-called twin freezers, which are capable of manufacturing more than two kinds of ice-creams. An example of this, as disclosed in Japanese Patent Early Publication No. 47-6681, has two refrigeration cylinders, left and right ones, each having a plunger for extracting the ice-cream therein. The freezer further has another plunger connected to both cylinders for extracting mixed ice-cream.

At the end of sale, ice-cream manufacturing apparatuses of this kind require daily pastaurization of the components which are in contact with the mix. Pasteurization may be made by injecting water or hot water containing a pasteurizing agent into the mix tanks and the refrigeration cylinders. Instead of such pasteurizing agent, recent pastaurization utilizes direct heating of the mix tanks and the refrigeration cylinders, as explained below.

For this purpose the refrigeration system having a compressor, a condenser, a decompressor, and an evaporator for refrigerating the ice-cream mix in a refrigeration cylinder and a mix tank, is operated as a heat pump, i.e. it is operated in a reverse direction by means of a four-way valve so as to make the evaporators function as radiators giving off heat supplied by the hot and highly pressurized refrigerant gas generated by the compressor. And the heat given off to the mix tank and the refrigeration cylinders, as disclosed in Japanese Utility Model Early Publication No. 63-20304. In a so-called hot gas system, the hot pressurized refrigerant gas supplied from the compressor is fed directly through bypassing nozzles into the evaporators, as disclosed in Japanese Patent Early Publication No. 60-46942.

Pasteurization of the twin type apparatuses is basically possible by means of such reversible refrigeration units as taught in Japanese Utility Early Publication No. 63-20304.

However, in the case of twin type apparatus a problem arises that if the two refrigeration units are heated independently for pasteurization as taught in prior art, the central plunger connected with both cylinders may not be heated to a pasteurizing temperature and not pasteurized adequately when the cylinder on one side is undergoing refrigeration, though the other cylinder is in pasteurization.

Ice-cream manufacturing apparatuses need periodic and interim cleaning and pasteurization at times, for example, just before holidays. In order to make the ice-cream softer and easy to discharge it out of the cylinders during such cleaning the refrigeration cylinders must be heated.

The cylinders are also heated to heat the ice-cream so that it recovers proper softness when it is frozen too hard, and to "regenerate" the ice-cream in which the ice-cream is heated once and then re-freezed to recover proper hardness lost in excessive beating. For these purposes some ice-cream manufacturing apparatuses, as one disclosed in Japanese Patent Early Publication No. 63-196232, are equipped with defrosting switches which enable the refrigeration unit to generate hot refrigerant gas to heat the cylinders to predetermined temperatures, and some, as one disclosed in Japanese Patent Early Publication No. 56-7656, are equipped with timers for controlling the period of heating the cylinders with hot gases.

However, the former Publication (JPEP No. 63-196232) resorts to only temperature control, so that excessive heating may happen on account of inaccuracy or malfunction of the temperature sensor of the apparatus, resulting in the degeneration of the ice-cream. The latter Publication (JPEP No. 56-7656) relies on the timer setting made by the user. However, since an optimum time setting is very difficult, over-defrosting or insufficient defrosting may easily take place.

The conventional heating system has another disadvantage in that at least two temperature sensors are required to detect the different temperatures and a rather complex electronic devices associated with the sensors. This is because the mix in the cylinders require different temperature depending on whether it is in the normal operating condition, process of removal from the cylinder, or regeneration process. (Removal temperature is the highest.)

BRIEF SUMMARY OF THE INVENTION

The invention is directed to solve the above problems. Therefore, a primary object of the invention is to provide a refrigeration controller for use with an ice-cream manufacturing apparatus, capable of intermittent operation of the apparatus to thereby avoiding continuous operation based on improper temperature setting of the refrigeration cylinders and the hoppers by automatically shifting up the preset temperatures.

Another object of the invention is to provide an ice-cream manufacturing apparatus characterized in that the apparatus has a plurality of refrigeration cylinders and associated refrigeration units for refrigerating several ice-creams, and that the pasteurization of individual refrigeration cylinders are continued until pasteurization is completed in all of refrigeration cylinders, thereby attaining perfect pasteurization.

A third object of the invention is to provide an ice-cream manufacturing apparatus that may control heating of the refrigeration cylinders so as to defrost the mix in the cylinders in the process of removing the mix for cleaning the cylinders and in the process of regeneration, so that defrosting may be carried out very easily without any training or skill.

In order to attain these objects a controller according to the invention having cylinders for manufacturing ice-creams by beating the ice-cream mixes therein provided from hoppers, and refrigeration units for cooling the cylinders at preset temperatures, is characterized by a timer for controlling the period of continuous operation of the refrigeration units (which will be referred to as refrigeration control timer), means for correcting the preset temperature at the end of predetermined period, and means for controlling the operation of said refrigeration units based on the corrected preset temperature.

The refrigeration control timer of the invention may supervise the refrigeration period so as not to over-refrigerate the refrigeration cylinders by limiting the refrigeration period that would be otherwise continued. When the lower limit of the cooling temperature preset by a user is lower than necessary. The preset temperature is shifted to a higher temperature automatically after a certain period of continuous refrigeration at too low a temperature, so that the refrigeration cylinder will be operated above the new preset temperature, preventing excessive freezing of the ice-creams. This assures not only proper softness and temperature required for tasty ice-creams, but also contributes to saving energy and extending the lifetime of the apparatus.

The apparatus of the invention above repeats ON/OFF of the refrigeration unit to maintain proper temperature and softness of the ice-cream, and ON/OFF of the beater in the cylinder, avoiding an overload of the beater. Namely, when the mix becomes too cold and/or too hard, the refrigeration unit and/or the beater is temporarily stopped until certain desirable temperature/softness is restored.

It should be noted, however, that the load on the blades of the beater to scrape the ice-cream off the cylinder wall would be too great immediately after the restarting of the beater, so that smooth scraping would be difficult and the motor would be overloaded if the ice-cream is frozen hard on the wall.

Therefore, it is desirable to delay stopping of the beater immediately after the refrigeration of the cylinder is stopped. This may be attained by stopping only the refrigeration unit as the electric current through the motor reached a predetermined level due to increase in hardness of the ice-cream. This assures mixing of hard ice-cream scraped off the cylinder wall before the ice-cream is hardened on the wall, so that smooth beating is possible in the next freezing, i.e. the overload may be avoided then.

The ice-cream manufacturing apparatus according to the invention has a plurality of ice-cream manufacturing units each having a hopper for storing a mix, a refrigeration cylinder for cooling and beating said mix which is supplied from said hopper, ice-cream dischargers provided one for each cylinder and one for a pair of said cylinders, refrigeration units associated with respective ice-cream manufacturing units and each having a refrigerant circuit for refrigerating said cylinder during ice-cream freezing process as well as for heating said cylinders and said hoppers during pasteurization, and is characterized in that said ice-cream manufacturing apparatus further comprises:

temperature detection means for detecting the temperatures of the cylinders and the hoppers;

mean for controlling the operation of each ice-cream manufacturing units based on the temperature detected by said temperature detection means, and for carrying out required heating; and a means for communicating between said refrigeration units the information regarding the pasteurization process in each refrigeration unit, and for terminating said pasteurization processes only after said heating is completed in both cylinders.

In the apparatus having the above mentioned features, termination of the required heating in each refrigeration cylinder is informed to the controller for controlling the heating of the other refrigeration units. This communication of the pasteurization information is performed in two-ways so as not to restart refrigeration before the pasteurization of all the cylinders are finished, ensuring perfect pasteurization of all the cylinders.

It is desirable to carry out the mixing only when sufficient amount of mix is in the hoppers, irrespective of the kinds of ice-creams manufactured. Therefore, it is preferable to provide the apparatus with a mix level detector in each hopper which may indicate the level of the mix and stop the heating if the detected level is too low.

This level indicator will prevent undesirable situations that may occur in heating insufficient amount of mix in the hopper, where for example an impeller whips the mix to form a foamy mix before delivering it to the refrigeration cylinder, or the heat degenerates the mix.

Towards the end of the pasteurization heating, the amount of heat given off by the hot pressurized refrigerant in the refrigeration cylinders tends to decrease and returns to the compressor without losing energy, i.e. the gas returns to the compressor still hot and pressurized. This demands the compressor to run under a high suction pressure or a high load and may lead to damage to the compressor. It is therefore desirable to control the amount of the refrigerant gas so as to meet the heating requirement, thereby saving the cost and relieving the compressor of the load.

To do so, there may be provided an electric current detector for detecting the current through the compressor motor (which will be referred to as compressor motor current detector) during a heating operation and a reverse valve which is mounted in parallel with the heating refrigerant circuit and is controlled by said compressor motor current detector.

With such a reverse valve as mentioned above, a greater amount of the refrigerant is allowed to flow at an early stage of the heating to effect efficient heating but the amount is gradually decreased towards the end of the heating in accordance with the increase in current detected by the compressor motor current detector due to the increase in suction pressure of the compressor. This will not only relieve the compressor of the load but also cut heating time to thereby better preserving the taste of the ice-cream.

As mentioned previously the refrigeration unit comprising a compressor, a condenser, a hopper, and a refrigeration cylinder may be switched to function as a pasteurization heating system by means of a four-way valve, which may reverse the flow of refrigerant through the compressor so as to form a hot gas circuit. The hot gas circuit thus formed involves, in addition to the four-way valve, various electromagnetic valves for controlling the flow of the cooling refrigerant and the hot gas and a reverse valve. A sudden actuation of the four-way valve may give rise to liquid trapping between the electromagnetic valves and the reverse valve, and generates undesirable noises in the valves.

Such liquid trapping also lowers the efficiency of the switching operation. The noises are not only favorable to hear and, furthermore may result in malfunction of the valves.

Therefore, in order to eliminate these problems mentioned above and allow smooth and quiet switching between the refrigeration and heating cycles, it is desired to provide means for temporarily relieve such pressure surge accompanying the actuation of the four-way valve.

The ice-cream manufacturing apparatus of the invention has mix tanks for storing mixes and supplying said mixes to respective refrigeration cylinders, and is characterized in that said apparatus comprises: means for heating said cylinders at different preset temperatures for different purposes; a single temperature detection means for detecting the temperature of said heated cylinders, and means for controlling said heating means by comparing said detected temperature with the preset temperatures.

The apparatus mentioned immediately above may distinguish the mode of defrosting, i.e. distinguish if the defrosting is for cleaning or for regeneration, and may stop the heating when the temperature of the refrigeration cylinder reaches the preset defrosting temperature.

Thus, with the single temperature detection means it is possible to heat the refrigeration cylinders at two different temperatures for cleaning and for normal sale time refrigeration. The user may defrost the cylinders quite easily and no special skill is needed in dealing with defrosting timers. The ice-cream is liable to neither over-defrosting or under-defrosting. Defrosting for cleaning and regeneration may be carried out in the minimum periods.

BRIEF DESCRIPTION OF THE DRAWINGS

FIGS. 6 A, B, C and D are the main flow-chart illustrating the overall control steps given by the control system shown in FIG. 5.

FIG. 19 A shows a case when the hopper contains sufficient amount of mix, and FIG. 19 B shows a case when the hopper contains insufficient mix.

DETAILED DESCRIPTION OF THE PREFERRED EMBODIMENT

Figure 1A:
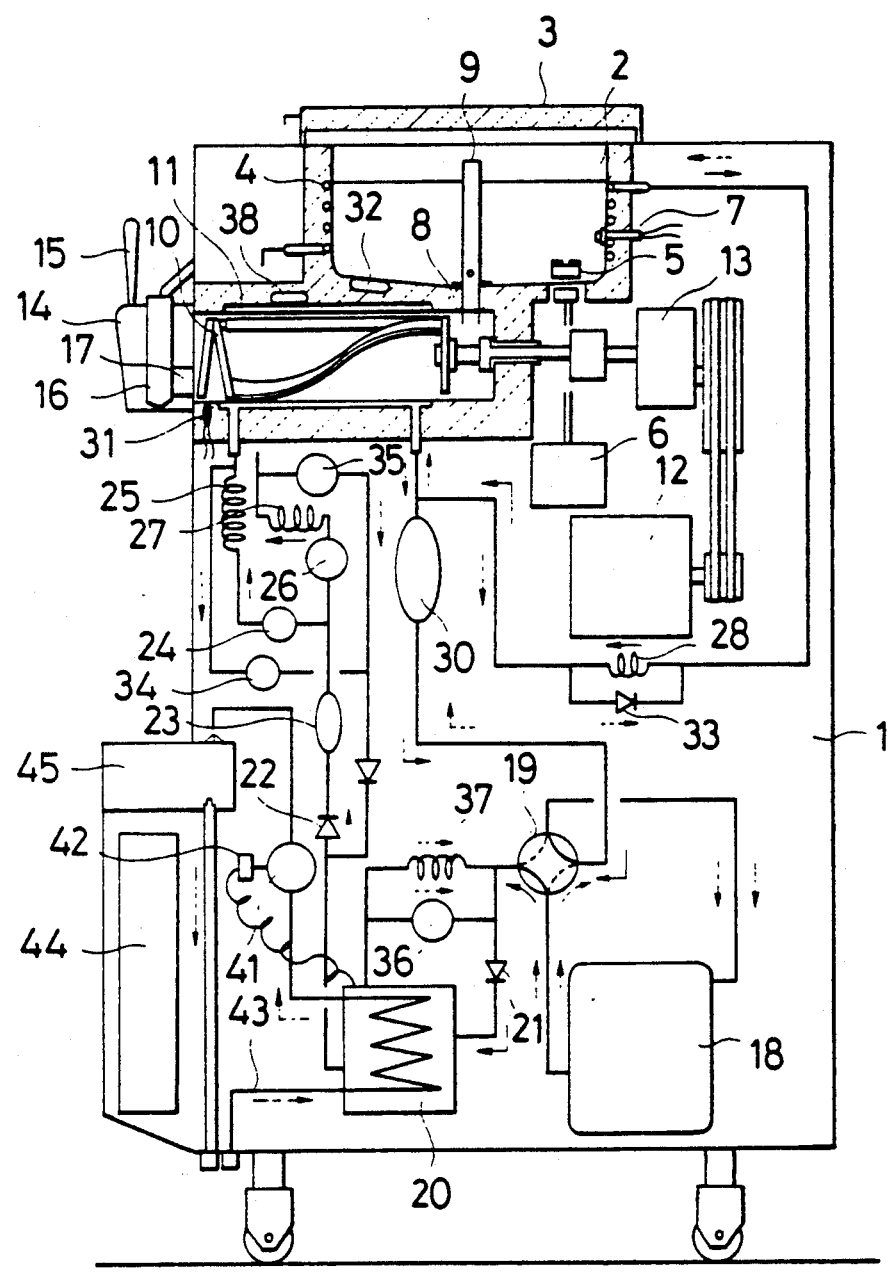
FIGS. 1 A and B illustrate the first soft-ice-cream manufacturing apparatus embodying the invention, in which FIG. 1 A is an elevational view showing the components of the apparatus, and FIG. 1 B is a front view of the apparatus.

The soft-ice-cream manufacturing apparatus of the invention may provide soft-ice-creams with three kinds of flavors such as vanilla, chocolate, and a blend of these two, by means of two refrigeration units like the one shown in FIG. 1 A.

In FIG. 1 A, a hopper 2 for storing a mix material is mounted on the body 1 of the apparatus. The hopper 2 has a hopper cover 3 which is removed when the mix is poured therein. The hopper has a hopper refrigeration coil 4 round it to refrigerate the hopper and the mix therein. An impeller 5 mounted inside and at the bottom of the hopper is rotated to stir the mix to prevent it from being frozen hard. The impeller is rotated during pasteurization heating also, provided that more than a predetermined amount of mix is in the hopper. The pasteurization is performed by heating the refrigeration cylinders with hot refrigerant gas circulating in the coil in the direction reverse to that of cooling refrigerant.

The amount of the mix in the hopper is monitored by a mix level sensor 7 mounted in the hopper. The mix level sensor 7 is made up of a pair of electrodes which may be electrically conductive, with the mix filling the space between them, but insulated if the mix level is lower than the electrodes, thereby detecting the level of the mix. When the mix level is detected to be too low, the controller stops the circulation of the hot gas and impeller, as explained below. A proper amount of mix is delivered from the hopper 2, through tubular supplier 9, to a refrigeration cylinder, where the mix is whipped or beaten by a beater 10. The beater is rotated by driving power which is transmitted from a beater motor 12 by means of a driving belt, a transmission 13, and a driving shaft.

Figure 2:
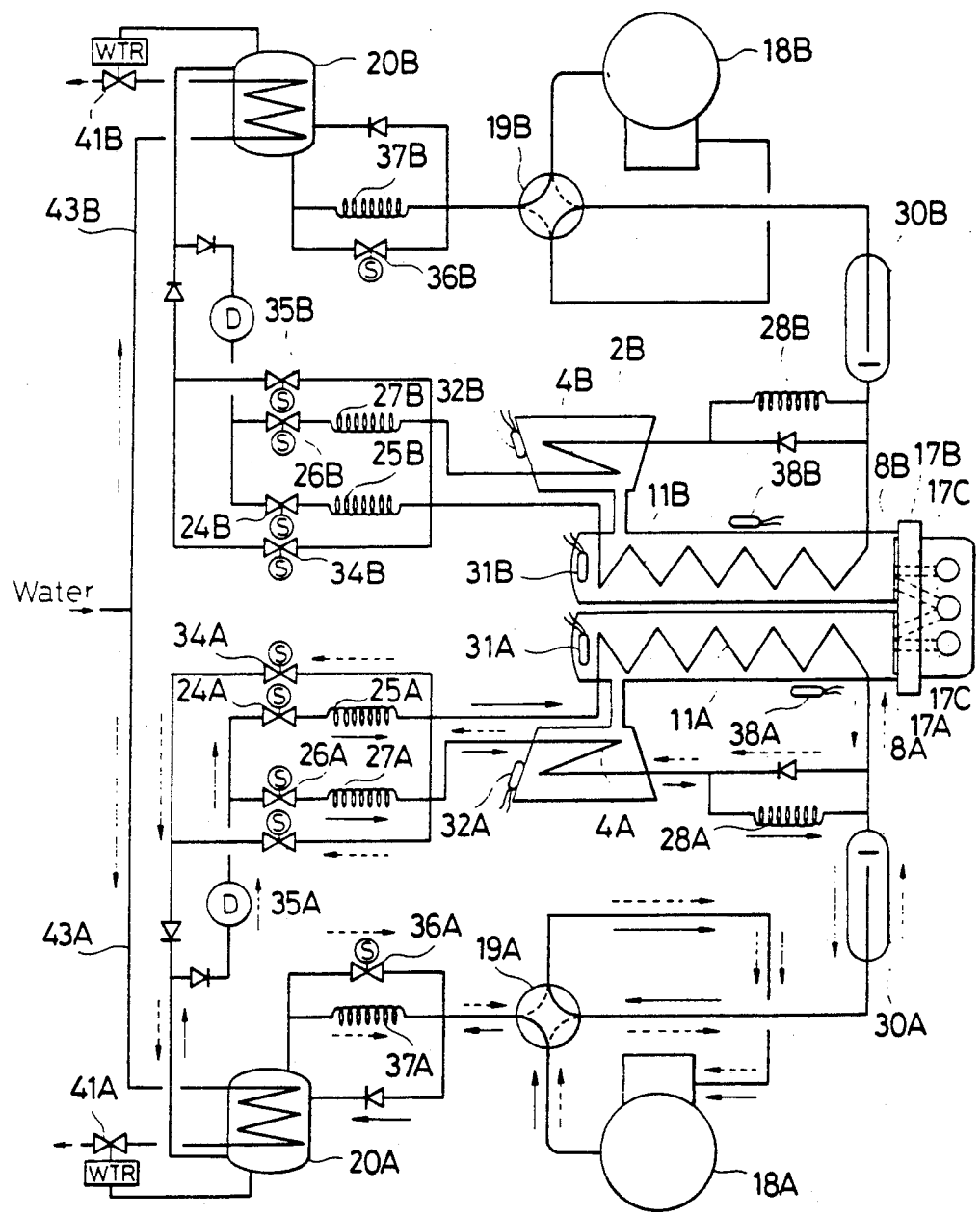
FIG. 2 illustrates the piping of the apparatus for use in refrigeration and pasteurization heating, said piping connected with two refrigeration cylinders and hoppers.

The cylinder is provided with an evaporator 11 around it. The ice-cream formed therein may be discharged out of a discharging outlet 17 which may be opened or closed by a plunger 16. The plunger may be moved up and down by moving up and down a lever 15 mounted on the freezer door 14. In this example two refrigeration cylinders 8A and 8B and three such discharging outlets 17A, 17B, and 17C, as shown in FIG. 2 are provided to provide three kinds of ice-cream. The outlet 17C having lever 15C is connected with both cylinders 8A and 8B. For example, the left lever 15A is for vanilla ice-cream; the right lever 15B is for chocolate-flavored ice-cream; and the central lever 15C is for mixture of vanilla and chocolate ice-creams. The rotating beater serves to force the ice-cream to the outlet during extraction of the ice-cream.

A refrigeration unit for refrigerating a hopper 2 and a refrigeration cylinder 8 is now described. A compressor 18 is connected with a four-way valve which changes the flow of the refrigerant through the compressor 18 during refrigerating from a forward direction (solid arrows) to the reverse direction (broken arrows) during heating. When the four-way valve 19 is actuated to effect refrigeration, the refrigerant is water-cooled in condenser 20 where hot pressurized refrigerant gas delivered from a reverse valve 21 is condensed and liquified. The liquified refrigerant is passed through a reverse valve 22 to a dryer 23, after which the refrigerant is divided into two flows with one flow reaching an evaporator 11 through a refrigeration cylinder valve 24 and a capillary tube 25 connected with a refrigeration cylinder 8 to refrigerate the cylinder 8, while the other flow reaching a hopper refrigeration coil 4 through a hopper valve 26 and a pre-stage capillary tube 27 connected with hopper 2 to refrigerate the hopper 2, and then out through a post-stage capillary tube 28. The refrigerant that has passed through the refrigeration cylinder 8 and the hopper 2 merges in an accumulator 30 and returns to the compressor 18, completing a refrigeration cycle as shown by solid arrows.

In order to manufacture good ice-cream with this refrigeration cycle, it is necessary to maintain the refrigeration cylinder 8 and the hopper 2 within a predetermined range of temperature (in the range of $-3°$ C. to $-8°$ C. for the refrigeration cylinder, and in the range of $5°$ C. to $10°$ C. for the hopper). The requirement for the refrigeration cylinder may be fulfilled by providing a temperature sensor 31 for sensing the temperature of the cylinder 8, and by controlling the cylinder valve 24 and the compressor 18 such that the valve 24 is opened (or turned ON) and the compressor 18 is turned on when the sensor senses a preset upper temperature, and that the valve 24 is closed (turned OFF) and the compressor is turned off as the sensor senses a preset lower temperature. It should be noted here that the control of the refrigeration cylinder 8 has priority over that of the hopper. Namely, the hopper valve 26 may be opened (ON state) under the condition that the cylinder valve 24 is OFF. This is to ensure that ice-cream be furnished to customers without interruption.

In pasteurization of the mix at an end of daily sale, say, the mix is heated, by turning the refrigeration unit into a heating cycle. This may be done by switching the four-way valve 19 and reversing the flow of refrigerant through the compressor (as indicated by broken arrows). Then a hot and pressurized gas is generated in the compressor 18, which is passed through the four-way valve 19 and the accumulator 30 and divided after the accumulator 30. A portion of the divided gas is delivered to the evaporator 11, while the remaining portion is delivered to the hopper coil 4, to heat the refrigeration cylinder 8 and/or the hopper 2 at predetermined temperatures for predetermined period of time. The refrigerant finishing the heating trip comes out of a cylinder valve 34 and a hot gas hopper valve 35, respectively, and merges together and fed into the water-cooled condenser 20, where the refrigerant is separated into liquid phase and gaseous phase. The gaseous refrigerant is returned, through an electromagnetic valve 36 and a parallel reverse capillary tube 37, to the four-way valve 19 to continue the heating cycle.

There is provided on the outer surface of the refrigeration cylinder 8 a pasteurization/preservation cooling sensor 38 for sensing the temperature of the refrigeration cylinder 8 and for controlling the cylinder valve 34 and the compressor 18 so as to maintain the mix within the predetermined upper and lower temperature limits. In controlling the heating of the hopper 2, the sensor 32 previously mentioned is also utilized to provide ON/OFF control of the hopper valve 35 and the compressor 18 so as to maintain the mix in the hopper within the same temperature range as for the refrigeration cylinder. The above mentioned sensor 38 is also utilized to manage ON/OFF operations of the compressor 18, the refrigeration cylinder valve 24, and the hopper valve 26 so as to maintain the cylinder and the hopper at a low temperature (within 8° C. and 10° C.) after the above mentioned pasteurization and until the next sale hour.

The refrigeration cylinder 8 is also provided with a supercooling sensor 40 (see FIG. 5A) for detecting abnormally low temperature that may happen during refrigeration. Detailed function of this sensor will be explained later.

A water-saving valve 41 is provided to prevent overloading on the compressor 18. The valve is opened in response to the signal from a gas pressure sensor 42 provided in the water-cooled condenser 20 for sensing the refrigerant gas pressure, thereby allowing the water in the water supply line 43 to flow in the direction as indicated by dotted arrows and the hot gas to release its energy to the water, and hence lose its pressure, before it is sucked into the compressor. Otherwise the compressor would be working on the hot pressurized refrigerant gas returning thereto from the refrigerating cylinder and the hopper without consuming much energy towards the end of the heating cycle.

Figure 1B:
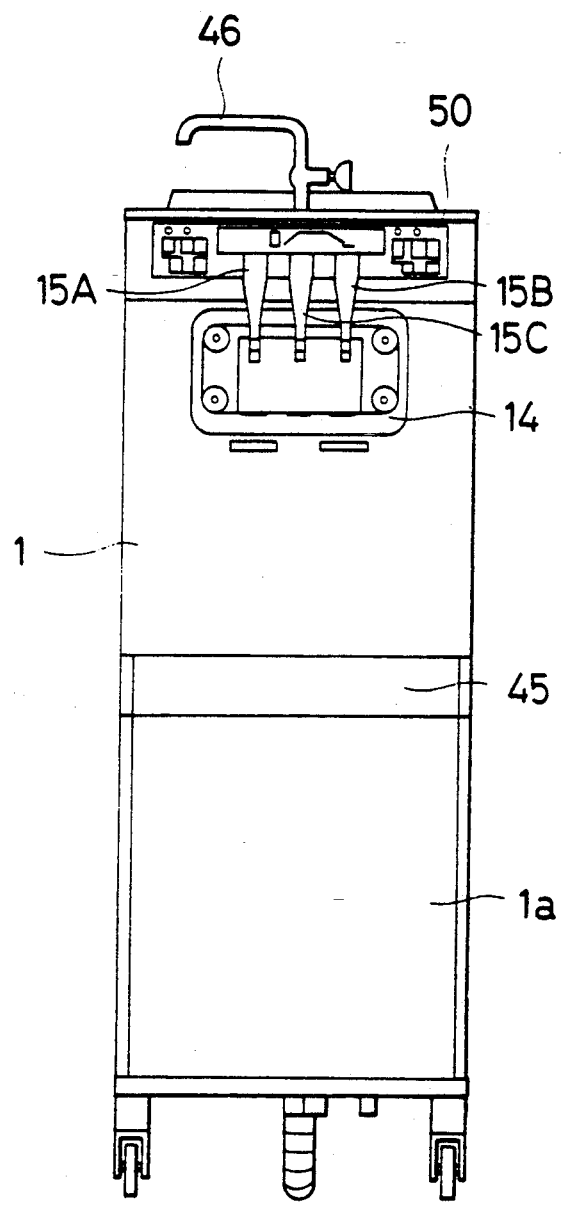

At the front end of the body 1 are a control panel 44 and a front drain receiver 45 above the control panel 44. As shown in FIG. 1B a water faucet 46 is provided to supply the hopper 2 with water for use in cleaning operations.

FIG. 2 illustrates a refrigerant circuitry of the apparatus having two refrigeration cylinders 8A and 8B, one (8A) for vanilla ice-cream and another (8B) for chocolate ice-cream, say. Those components having the same numerals as in FIG. 1A, labeled with A or B, have the same functions as their counterparts in FIG. 1A.

Figure 3:
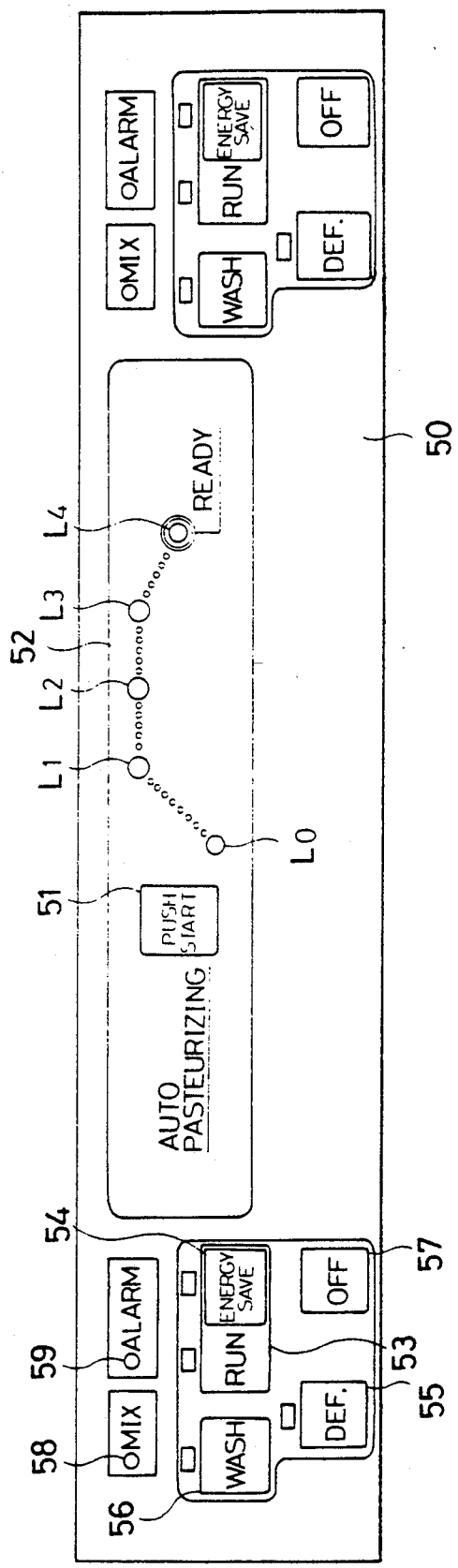
FIG. 3 illustrates an indicator/control panel disposed at the front end of the ice-cream manufacturing apparatus.

As shown in FIG. 3 there is provided a control panel 50 on the upper portion of the freezer door 1, comprising a pasteurization switch 51, pasteurization monitor 52 and other switches and indicators for right and left refrigeration units corresponding to two kinds of ice-cream A and B (which will be referred to as A ice-cream and B ice-cream, respectively). A switch 53 is provided for presetting the upper and lower temperatures for the refrigeration cylinders and the hoppers so as to maintain the mixes within the respective temperature ranges. An energy saving switch 54, when pushed, functions to shift up the preset temperature ranges a little so that energy consumption for refrigeration may be minimized during night hours when only a small number of customers purchase ice-cream and only infrequent refrigeration is necessary. A defrosting switch 55 is to soften the frozen ice-cream moderately prior to removing from the cylinder or to soften the ice-cream which is frozen too hard due to long-time freezing, by circulating a hot gas through the heating components round the freezing cylinder. A cleaning switch 56 is to drive the beater 10 for a predetermined period of time during, for example, removing the defrosted mix or cleaning the cylinder filled with cleaning water. A switch 55 is to start defrosting under the condition that the cleaning switch 56 has been turned on, and continues defrosting until the switch 55 is pushed again. The switch 55, however, permits thawing of the mix during the mix regeneration process, and upon completion of the regeneration, automatically resume regular refrigeration. A pasteurization switch 51 is pushed at the end of sale daily to initiate pasteurization of the refrigeration cylinder and the hopper. Monitor lamps $L_0$, $L_1$, $L_2$, $L_3$, and $L_4$ (denoted as pasteurization LED 0 through LED 4) indicate in turn four different levels of pasteurizing levels. These steps provide pasteurization heating which is in accord with the official standard of pasteurization, which requires more than 30 minutes of heating in total at a temperature higher than 68° C. This pasteurization provides heating of more than 30 minutes at a temperature above 70° C.

Figure 4:
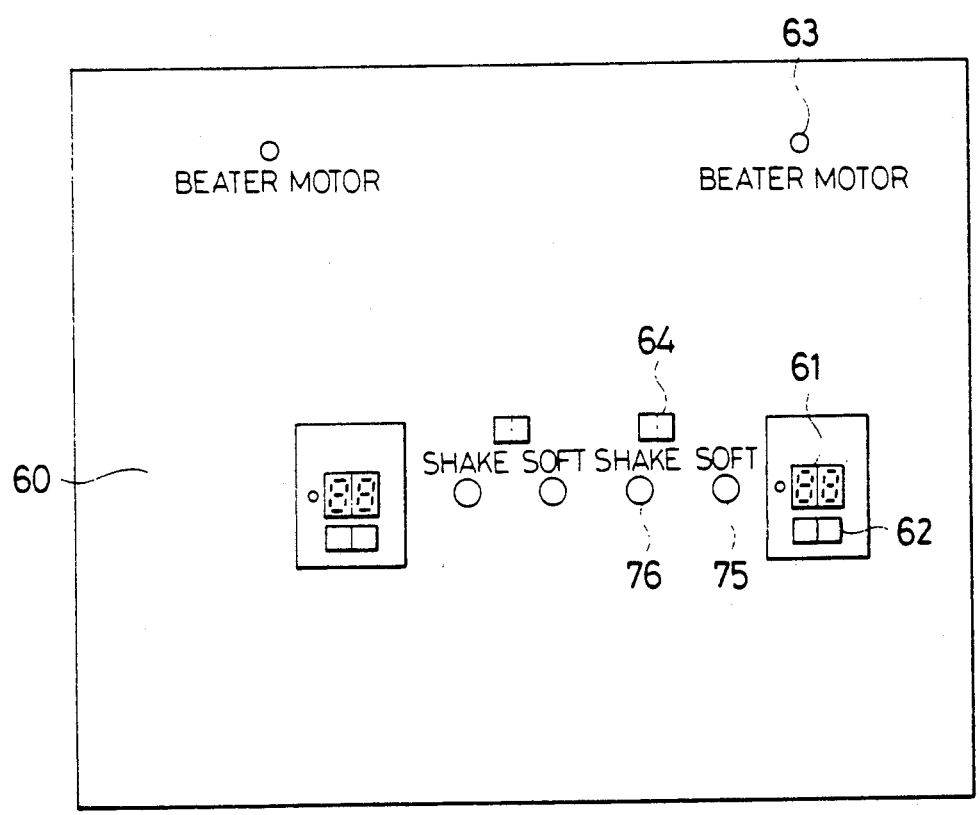
FIG. 4 illustrates another indicator panel disposed behind the front panel.

A halt switch 57 is to halt all the undergoing operations (such as freezing, defrosting, cleaning, and pasteurization). A mix supply lamp 58 turns ON when the level of the mix is lower than the mix level sensor 7 in the hopper 2, informing that condition. An alarm lamp 59 warns certain abnormal conditions encountered, including said shortage of the mix, by flashing the corresponding lamp. The indicators and lamps on the right control panel also provide similar functions. The alarm lamp 59 is responsive to such abnormal conditions as a failure of water supply, energization of an overload relay (OLR) for a beater motor, supercooling and excessive softening of the ice-cream, insufficient pasteurization or refrigeration, power shut down, and sensor malfunction. Upon pushing the switch 62, the contents of these alarms are indicated in turn in coded form on respective 7-segment indicators 61 mounted on an operation board 60 as shown in FIG. 4 which is installed inside the front panel 1a of the body 1. On the operation panel 60 is a reset button for the beater motor 12, a switch 64 for switching between shake and soft ice-cream, and variable resistors 75 and 76 for controlling the temperatures of the shake and soft-ice-cream.

Figure 5A:
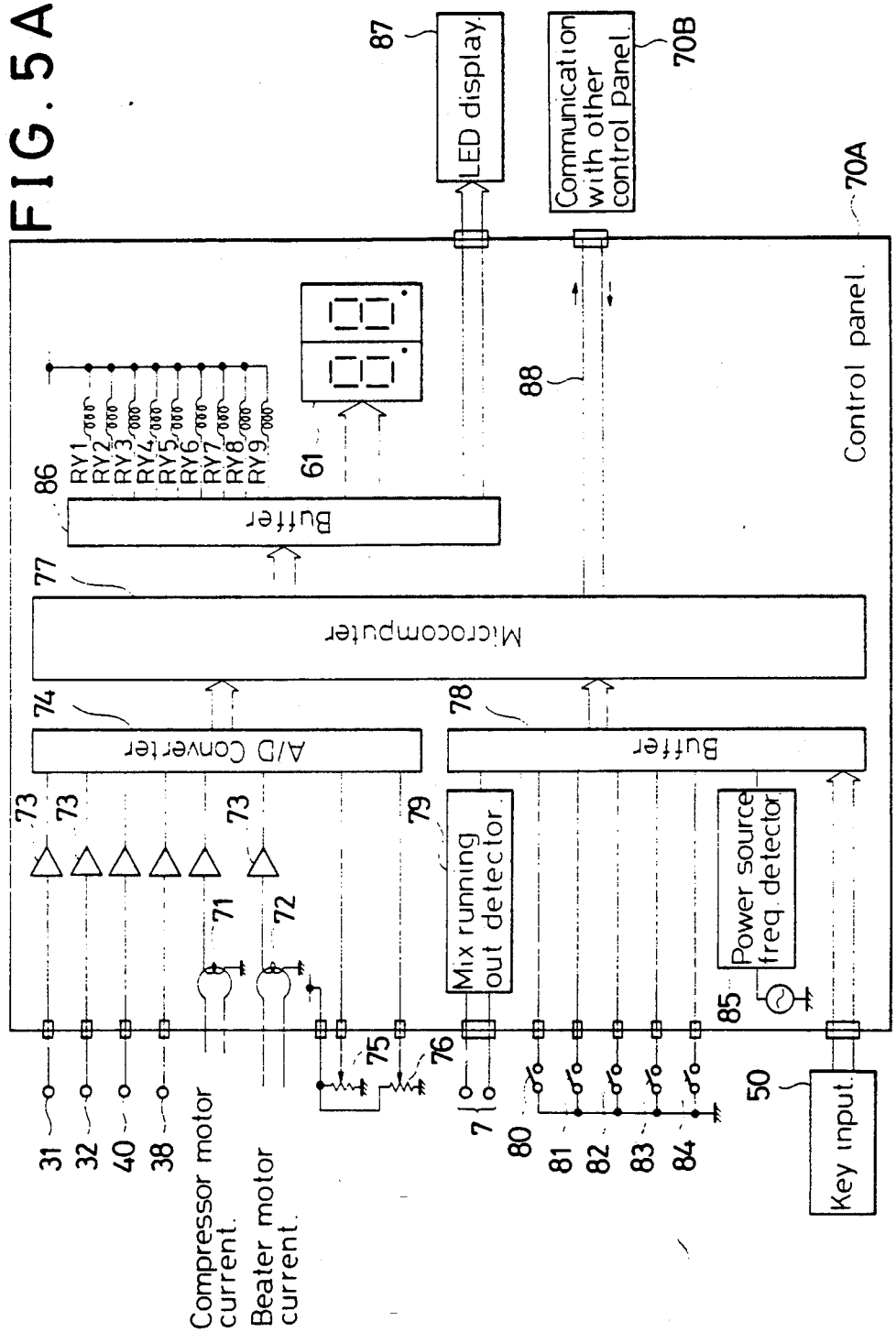
FIGS. 5 A and B illustrate one of the control systems of the ice-cream manufacturing apparatus, in which FIG. 5 A is the circuit diagram of one control system, and FIG. 1 B is the circuit diagram of the components to be controlled.

FIG. 5A shows the structure of a control system mounted on the soft-ice-cream manufacturing apparatus of this invention. There are provided two such control systems for the right and the left refrigeration cylinders 8A and 8B, respectively, as viewed from the front of the ice-cream manufacturing apparatus, which are mounted on control panel 70A and 70B, respectively. FIG. 5A shows the right control system. The control system has an A/D converter 74 which receives, via an amplifier 73, signals from the cylinder sensor 31, the hopper sensor 32, the supercooling sensor 40, the pasteurization/preservation cooling sensor 38, and the electric current sensors 71 and 72 sensing the electric currents through the compressor motor and the beater motor, respectively. The A/D converter 74 also receives the outputs of the variable resistors 75 and 76. The variable resistor 75 electrically controls the temperature of the refrigeration cylinder so that optimum temperature of the mix may be obtained when it is making soft-ice-cream and the variable resistor 76 similarly controls the temperature of the cylinder when it is making shake. All these signals are A/D converted for ease of the control. The supercooling sensor 40 functions as follows. When the ice-cream manufacturing apparatus is in operation with little mix left-over in the refrigeration cylinder near the end of sale, for example, the mix would be supercooled due to small refrigeration load (or little ice-cream mix). Then the temperature of the evaporator eventually lowers to a certain temperature indicative of the supercooling. The sensor 40 detecting this first supercooling instructs the controller to start first defrosting operation. After the completion of the first defrosting operation, the sensor 40 instructs a second defrosting if it detects a second supercooling, but instructs termination of refrigerating operation upon detection of a third supercooling to thereby preventing further freezing of the mix and an overload as discussed below.

The current sensor 71 of the compressor monitors the suction pressure of the compressor. Namely, the sensor 71 senses an increase in current through the compressor motor caused by an overload on the compressor. Typical overload is due to decrease in heat exchange (i.e. decrease in thermal load) in the refrigeration cylinder towards the end of a heating cycle, resulting in circulating hot and high pressure refrigerant gas back to the compressor. Upon detection of such overload current by the sensor 71, the reverse valve 36 is closed to reduce the flow rate of the refrigerant to minimize the load. If the current sensor 72 senses an overload current of the beater motor due to hardening of the mix, it stops only the refrigeration of the pertinent cylinder, leaving the beater in operation, to thereby prevent the mix therein from being frozen further. As the temperature of the mix rises to a preset temperature as measured by the sensor 71, the beater is stopped. The mix will remain soft until the next beating is resumed and require only a little torque of the beater.

The central processing unit (CPU) 77 processes digitized signals furnished from the A/D converter 74. The CPU also receives, via a buffer 78, such signals as mix-run-out signal, water supply failure signal, compressor overload signal, beater motor overload signal, A-ice-cream discharging signal, B-ice-cream discharging signal from the mix level sensor 7, a mix-run-out detector 79, a water supply failure sensor 80, a compressor overload relay (OLR) switch 81, a beater motor overload relay (OLR) switch 82, discharging switches 183 and 284, respectively. Additionally, the buffer 78 transmits to the CPU a frequency signal of the power source input from a power source frequency detection circuit 85 and signals input from various switches on the control panel 50.

Thus, the CPU 77 processes the digital signals fed from the A/D converter 74 as well as signals from the buffer 78 to instruct driving/stopping of various components involved in the apparatus along with necessary indication on the panel 50. Such driving/stopping instruction is output via the buffer 86, resulting in controlled operations of relays RY1, RY2, RY3, RY4, RY5, RY6, RY7, RY8, and RY9, which in turn operate in a controlled manner a compressor motor CM18M, a beater motor BM12, a mix stirring motor KM6, a refrigeration cylinder valve F.S24, a refrigeration hopper valve F.H26, a hot gas cylinder valve H. S34, a hot gas hopper valve F.H35, a four-way valve QV19, and a reverse valve RV36, respectively. The conditions concerning the pasteurization, shortage of the mix, and other alarms will be displayed if any on the indicator LED 87 along with the indication of the sources of the alarms on the 7-segment indicator 61. The CPU also maintains communication through a transmission line 88 between the right and left control systems installed on the panel 70A and 70B for A- and B-ice-creams, respectively.

The ice-cream manufacturing apparatus illustrated in FIGS. 1 through 5 carries out the following operations.

(I) Refrigeration in Normal and Energy Saving Modes (I)-1 Normal Refrigeration

The refrigeration switch 53 turns ON and OFF the compressor 18, the refrigeration cylinder valve 24, the refrigeration hopper valve 26, and the beater motor 12 based on the cylinder sensor 31, to refrigerate the refrigeration cylinder 8 within the upper temperature limit (+0.5° C.) and a lower temperature limit, and the hopper 2 within +8° C. and +10° C. under the control of the hopper sensor 32. In this operation soft-ice-cream may be made available in the cylinder 8 for individual customers.

(I)-2 Correction of Refrigeration Control in Case of Insufficient Refrigeration

In cases where the lower temperature is preset too low to reach by the sensor so that refrigeration is continued endlessly over a predetermined period (normally 30 minutes), the lower temperature is automatically shifted upward by a predetermined amount to see that the refrigeration is stopped in a given time interval. If the refrigeration is yet continued endlessly, further shift is given repeatedly until the the lower limit reaches 0° C., thereby preventing the ice-cream from deteriorating from over-freezing and relieving the the compressor 18 of the overload.

(I)-3 Energy Saving Refrigeration

During night time when only a small number of customers uses the apparatus, the operator may switch the refrigeration units from the normal refrigeration mode to an energy saving mode by means of a switch 54 in which the lower temperature limit is shifted upward. The apparatus is then run based on the new temperature limit, requiring less refrigeration and hence less energy.

(I)-4 Refrigeration during a Start-Up Period

During the start-up of the apparatus in preparation for the sale, the lower temperature limit is lowered to that temperature defined by the equation (preset temperature −0.5° C.) until a certain number of ice-cream (normally 40 cups) is sold. This permits quick freezing of the mix and selling it in a good condition, because the ice-cream mix was defrosted for pasteurization the previous night.

(II) Pasteurization and Preservation Cooling

A second embodiment of the invention concerns pasteurization and preservation cooling of the ice-cream manufactured.

(II)-1 Pasteurization

If the pasteurization switch 51 is turned on when sufficient amount of mix is in the hopper, the four-way valve 19 is actuated to switch the refrigeration unit from the refrigeration mode to the pasteurization mode. Accordingly, the hot gas generated in the compressor is supplied to the refrigeration cylinder 8 and the hopper 2. The refrigeration cylinder 8 and the hopper 2 are both maintained in the range of +70° C. to +72° C. for about 40 minutes in total by means of the pasteurization/preservation cooling sensor 38 and the hopper sensor 32 which control ON/OFF of the compressor 18, the hot gas cylinder valve 34, and the hot gas hopper valve 35. The pasteurization process is indicated by the indicators LED 0 through LED 4 in such a way that LED 0 flashes at the beginning of the pasteurization; LED 1 flashes as the temperature of the refrigeration cylinder reaches +72° C. and LED 0 is lit without flashing, which pasteurization lasts for 13 minutes above 70° C.; LED 1 is lit on and LED 2 start flashing in the subsequent 13 minutes; and so on, until LED 4 is lit on and about 40 minutes (correctly 13 minutes×3=39 minutes) of pasteurization heating is completed. The flashing of LED 4 indicates that the refrigeration that follows the pasteurization is now undergoing.

(II)-2 Preservation Cooling

In the Preservation cooling that follows the pasteurization the pasteurization/preservation cooling sensor 38 and the hopper sensor 32 controls the compressor motor 18M, the refrigeration cylinder 24, and the refrigeration hopper valve 26 so that the refrigeration cylinder 8 and the hopper 2 are cooled below a predetermined temperature (e.g. +13° C.) in less than a predetermined time (e.g. 90 minutes), and are maintained in the temperature range of +8° C. to +10° C. afterward for preservation of the the mix.

(III) Cleaning

The switch 56 is turned to clean the apparatus at the end of sale, say. By turning on the switch 56, the beater motor 12 is activated for a predetermined period to discharge the mix out of the then opened discharging outlet. After the mix is removed, water is fed from the water faucet 46 into the hopper 2 and the refrigeration cylinder 8 to clean them with the help of the rotating beater 10.

(IV) Defrosting (or Softening of the Mix)

A third embodiment of the invention concerns defrosting or softening of the frozen ice-cream.

(IV)-1 Defrosting to Remove the Mix

In order to make easy the recovery of the mix, the refrigeration cylinder 8 is heated to a predetermined temperature (e.g. +5° C.) with a hot gas so that the mix therein is soften. This heating is initiated by turning on the defrosting switch 55 and is controlled by means of the pasteurization/preservation cooling sensor 38 which controls ON/OFF of the hot gas cylinder valve 34.

(IV)-2 Defrosting during Refrigeration (in Energy Saving Mode)

By turning on the defrosting switch 55 during refrigeration operation the refrigeration is temporarily stopped while the mix in the refrigeration cylinder 8 is heated by a hot gas to a predetermined temperature (e.g. +0° C.). The refrigeration is then resumed to cool the mix down to a preset temperature. The heating is controlled also by means of the pasteurization/preservation cooling sensor 38 which is controlling the ON/OFF of the hot gas cylinder valve 34.

In addition to the operations described above, the following protective operations are provided.

(V) Protective Operation following Four-way Valve Operation

To prevent possible refrigerant trapping in the pipes and noises generated immediately after the actuation of the four-way valve 19 which switches refrigerant circuits, the refrigeration cylinders 24, the refrigerating hopper valve 26, the hot gas cylinder valve 34, and the hot gas hopper valve 35 are opened for a predetermined period of time (e.g. 30 seconds).

(VI) Beater Motor Overcurrent Protection

When the current sensor 72 detects a predetermined level of current (e.g. 4.7 A) which reflects an overload on the beater motor due to hardening of the mix caused by over-freezing, the refrigeration operation is stopped (i.e. only the compressor motor 18M is turned off) and stirring the mix is continued. As the beating load is reduced to a level for which the current is less than 4.2 A, refrigeration is resumed (i.e. the compressor motor 18M is turned on) to cool the mix until the sensor 31 senses a predetermined temperature or until a predetermined period elapses. This procedure prevents overload on the beater motor.

(VII) Protection of Compressors during Pasteurization Heating

Towards the end of the heating, heating load lowers significantly, which may cause an overload on the compressor motor. To relieve the compressor motor of the overload, a reverse valve 36 is actuated to reduce the amount of the gas to be taken in the compressor. The overload is detected by means of the current sensor 71 monitoring the current through the compressor motor. The reverse valve 36 is turned off when the current exceeds a predetermined level (e.g. 5.3 A) and is turned on when the current lowers below another predetermined level (e.g. 3.5 A).

Figure 5B:
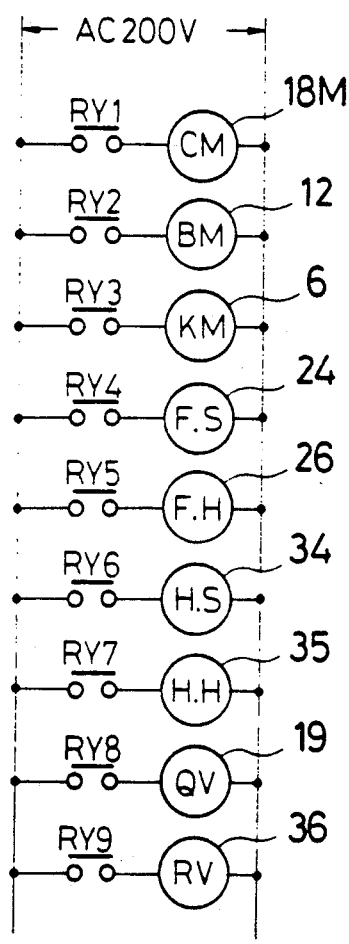
Figure 7A:
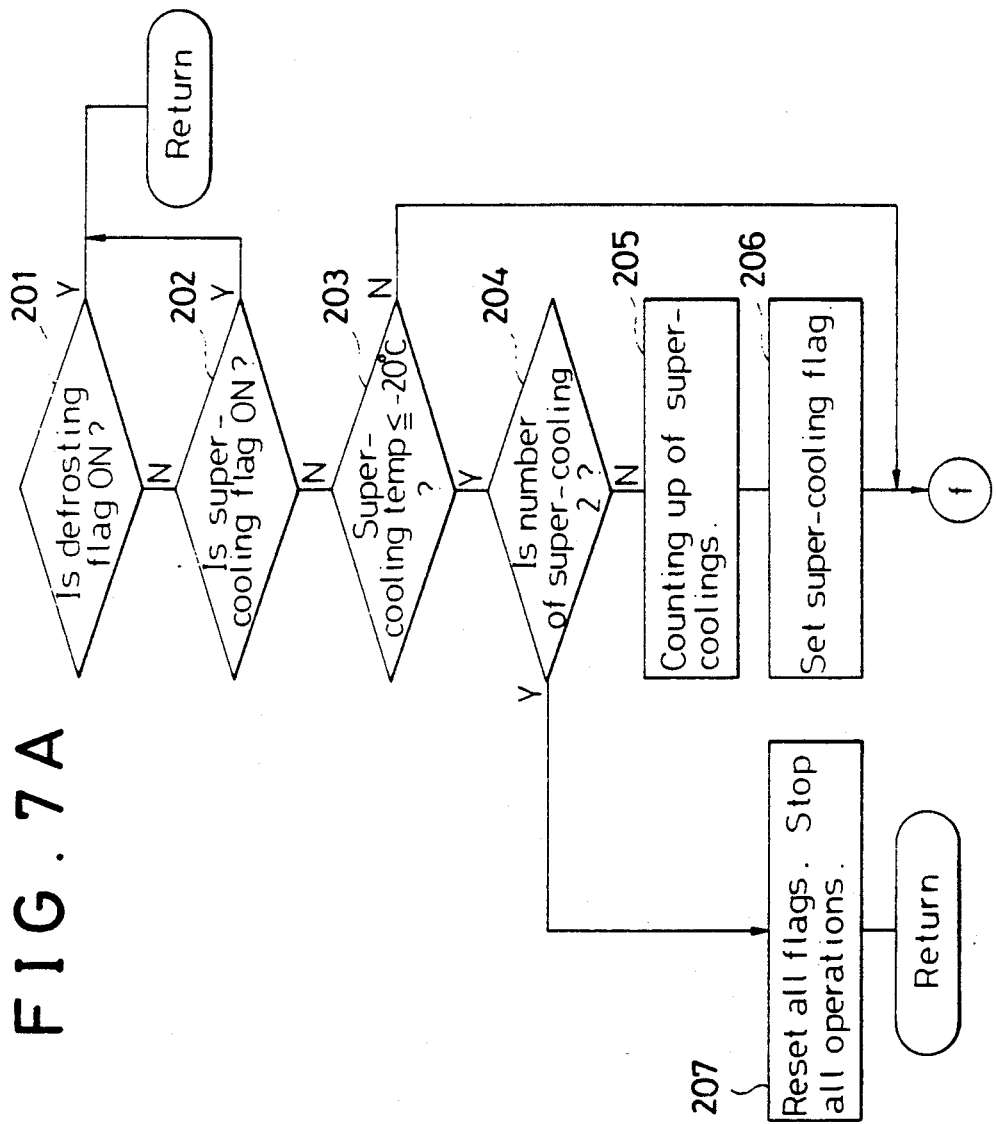
FIGS. 7 A, B, C, D, E and F taken together illustrate the flow-charts for refrigeration operations in normal and in energy saving modes.
Figure 7C:
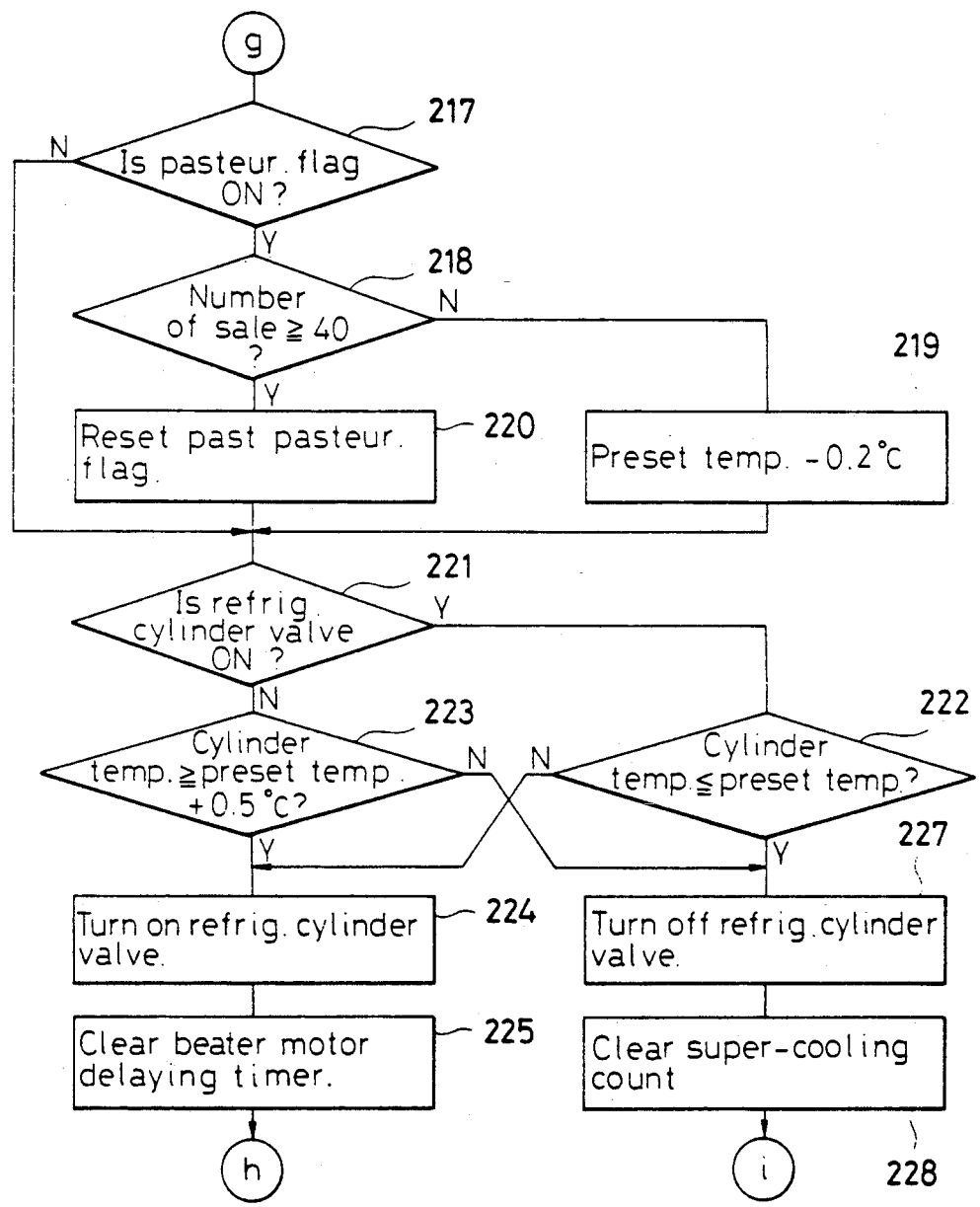
Figure 7D:
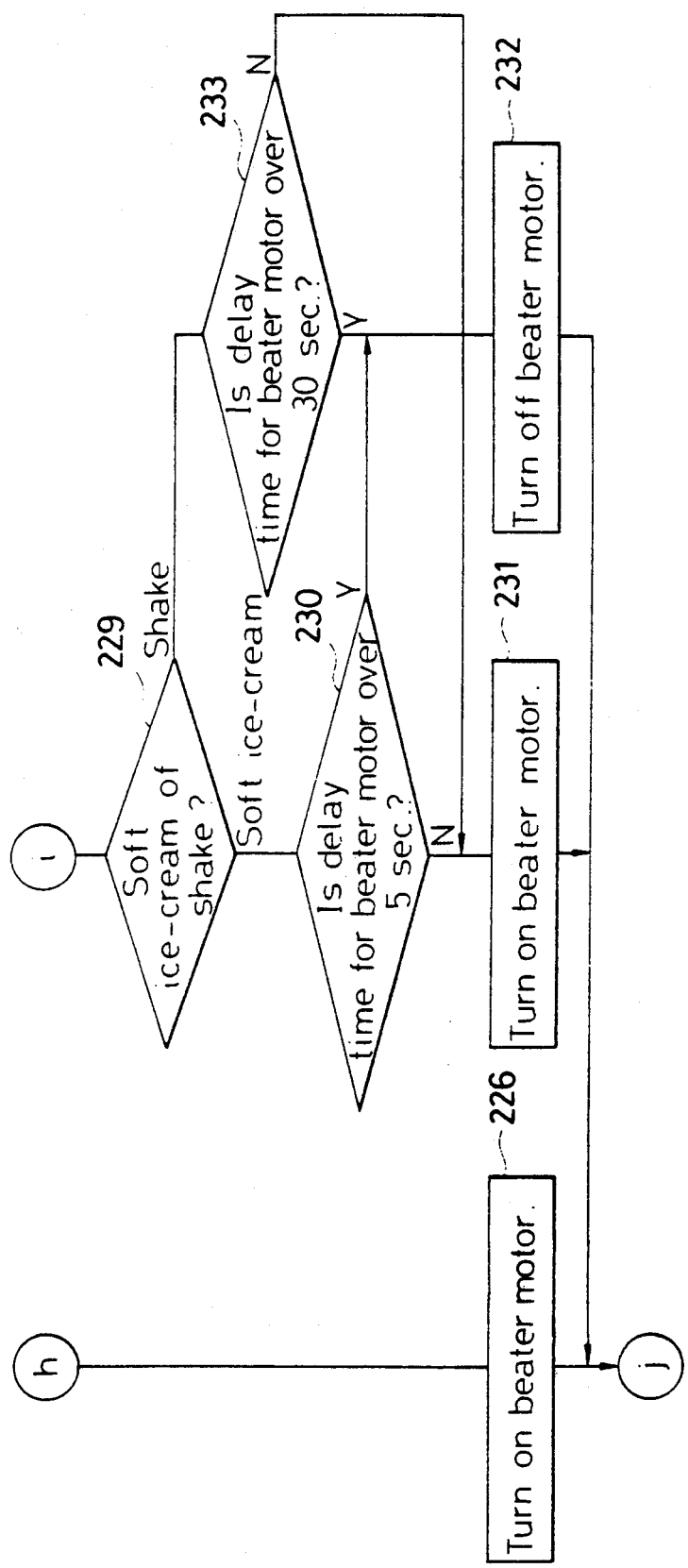
Figure 7E:
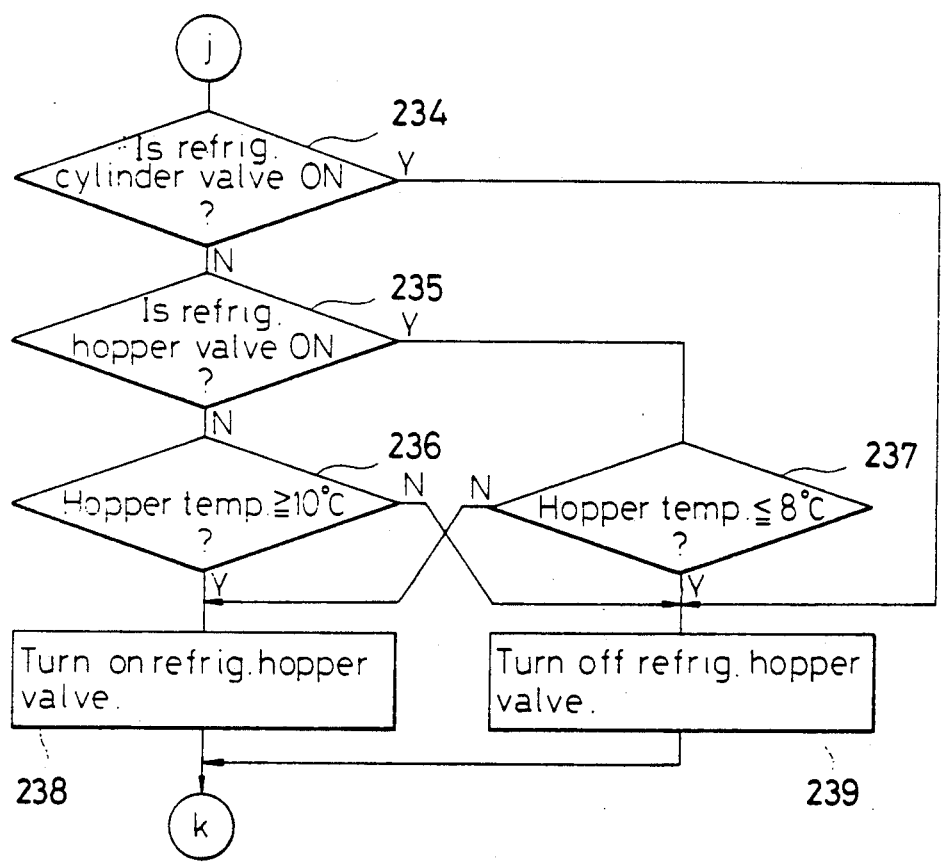
Figure 7F:
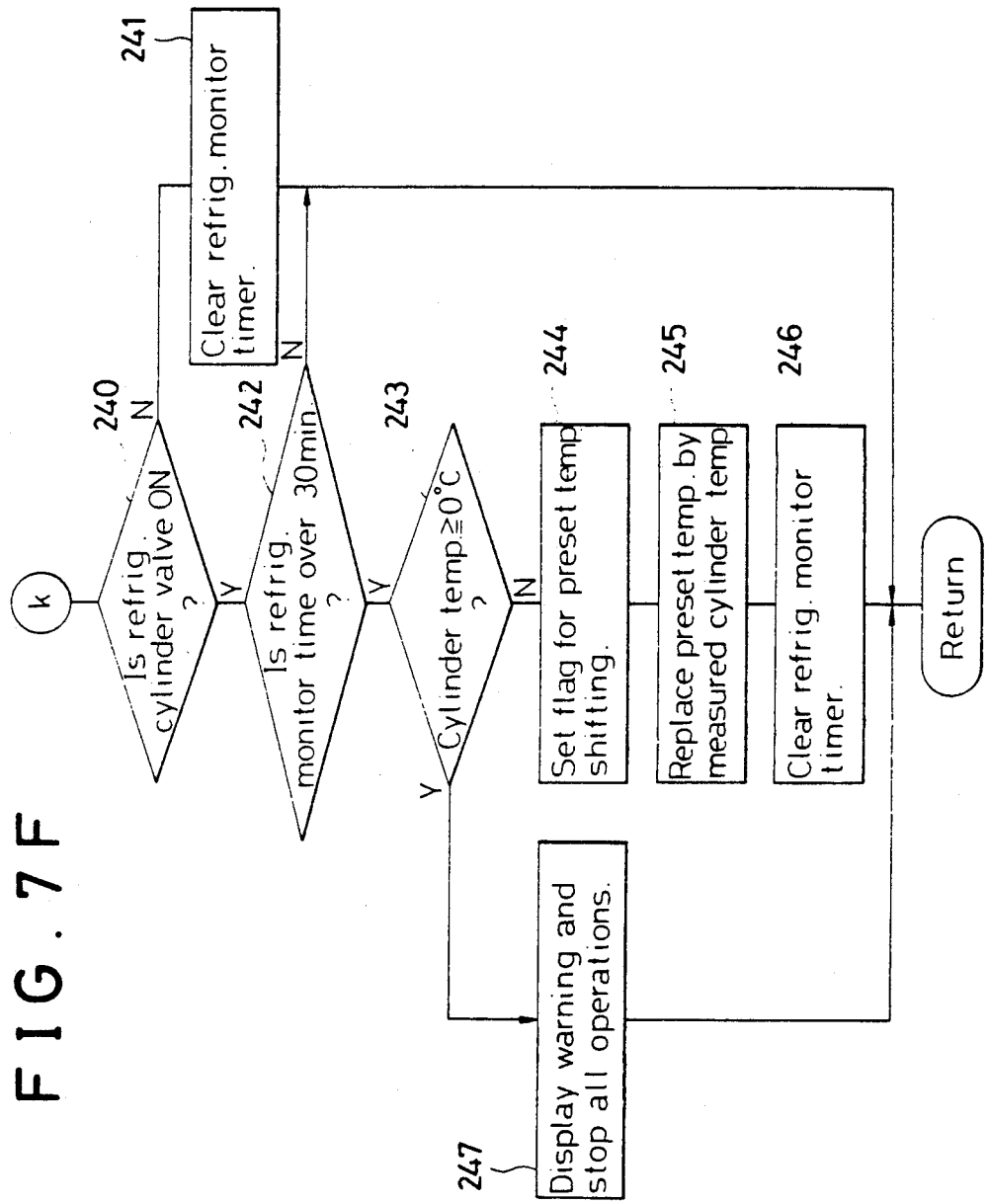
Figure 8:
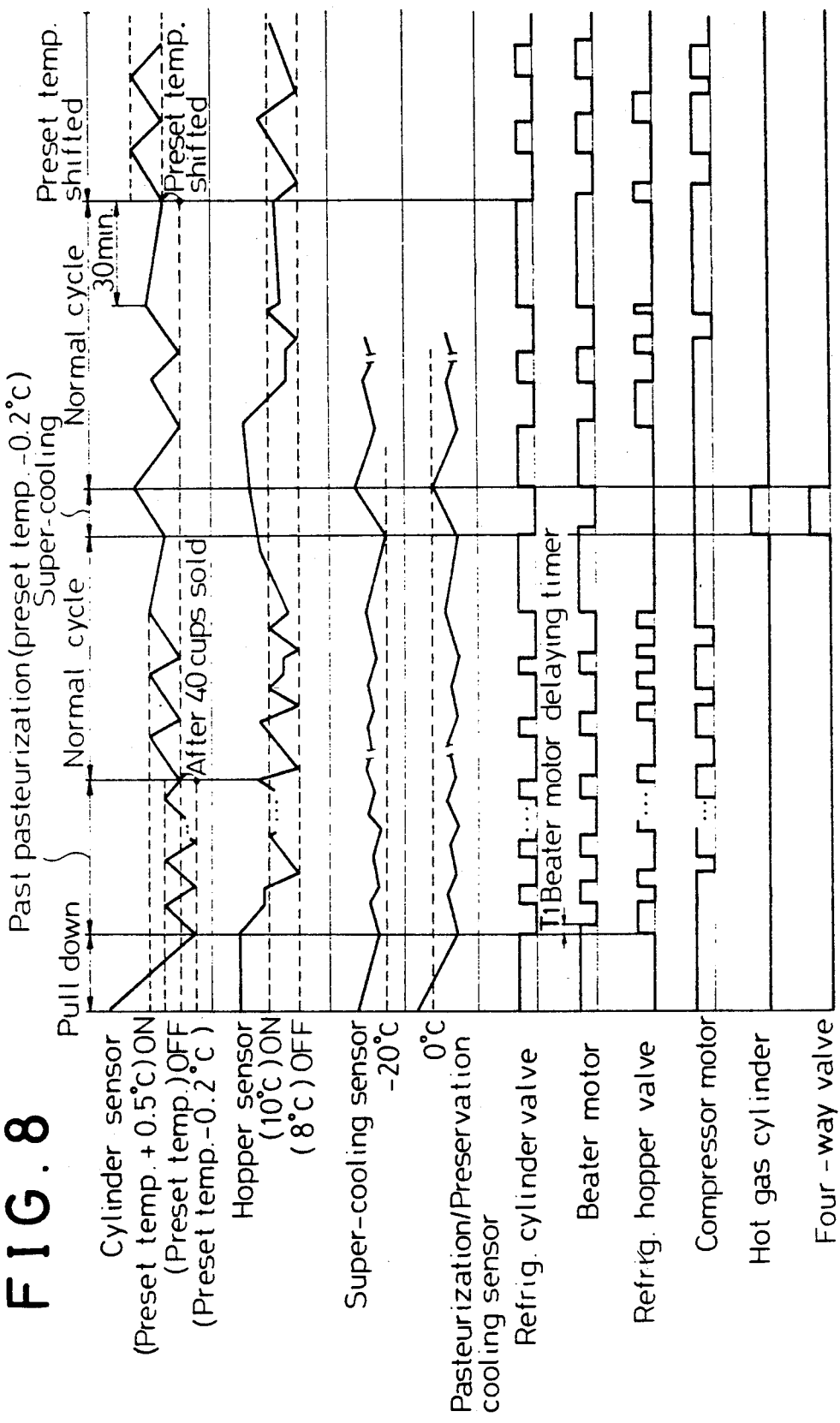
FIG. 8 is a timing chart for the normal and energy saving mode refrigeration.
Figure 9A:
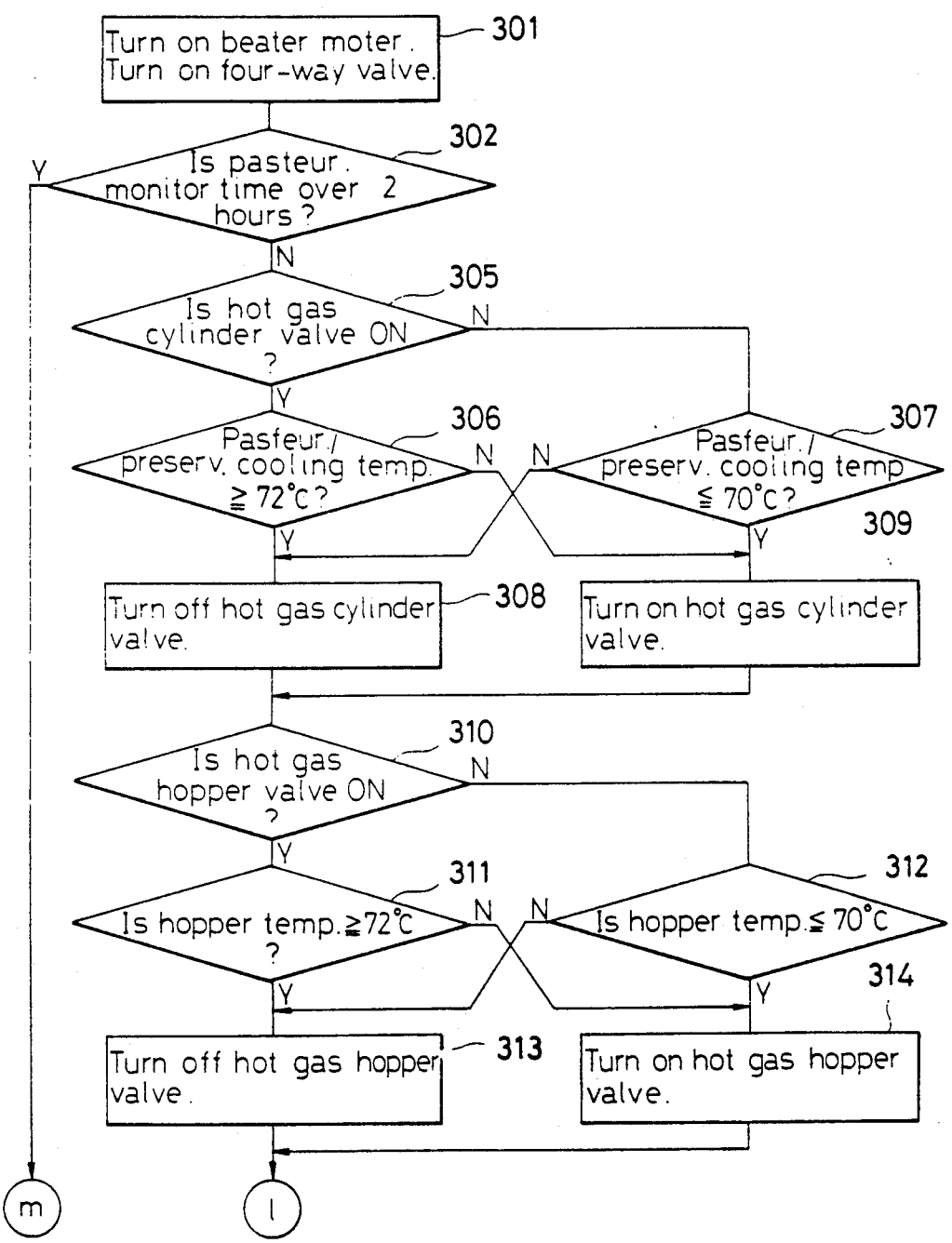
FIGS. 9 A, B, C, D, and E taken together illustrate the flow-charts for the pasteurization operation.
Figure 9B:
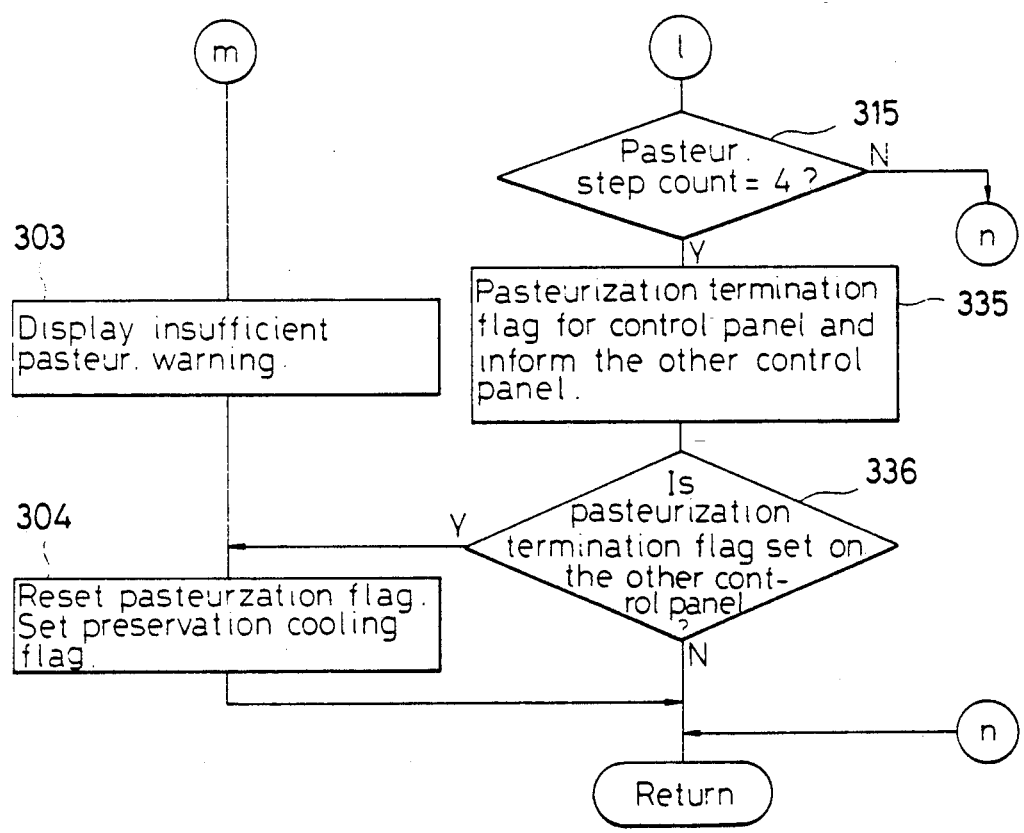
Figure 9C:
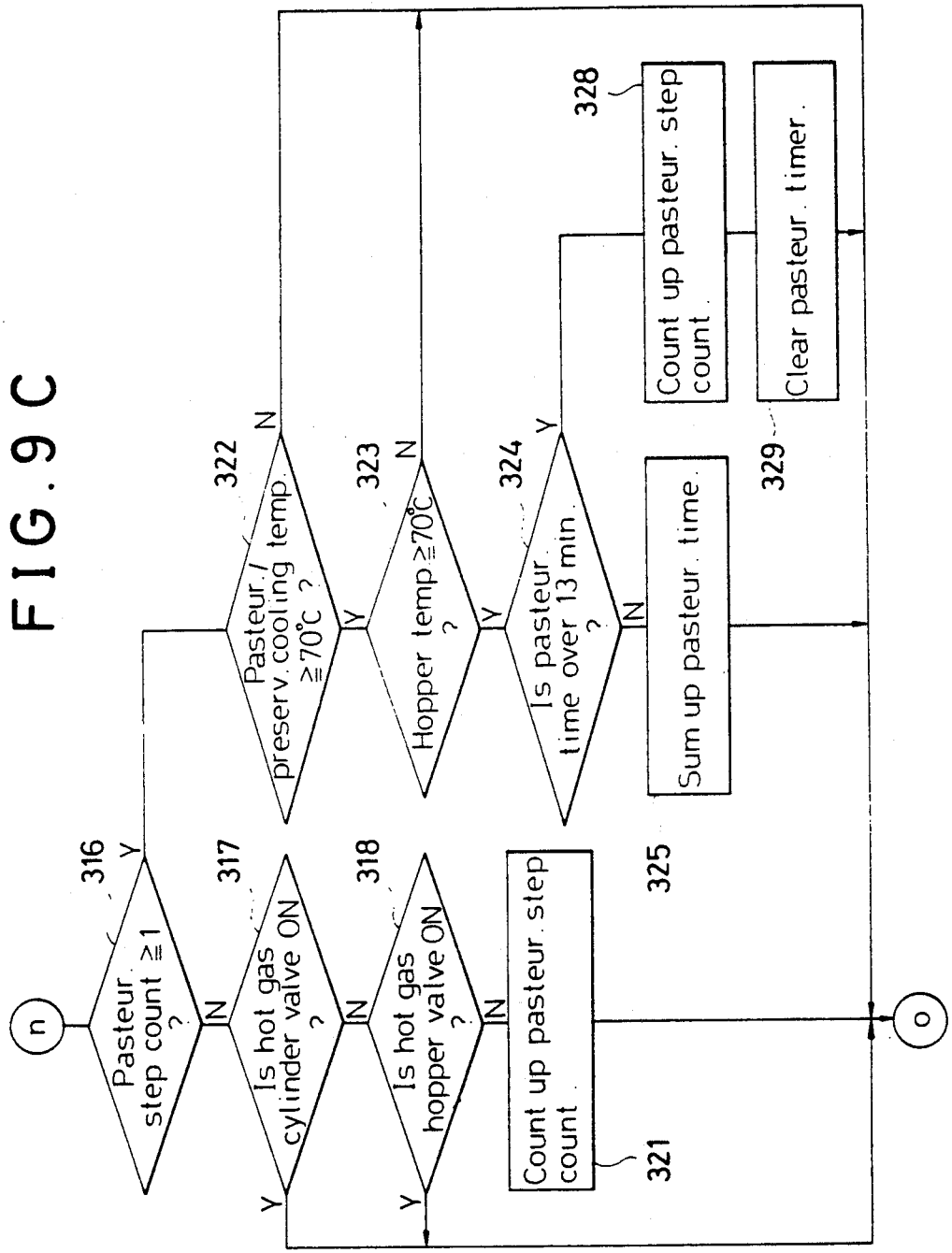
Figure 9D:
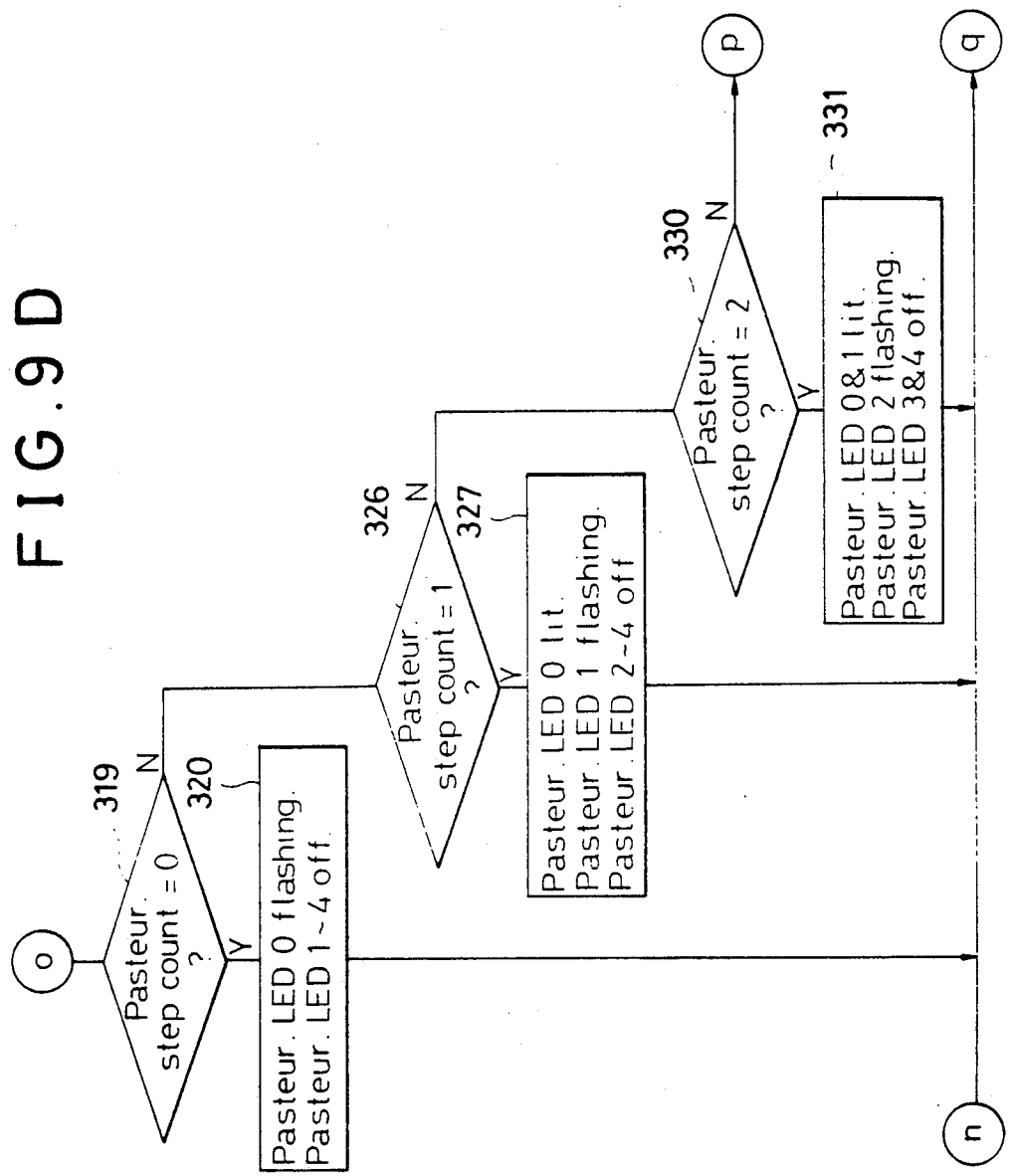
Figure 9E:
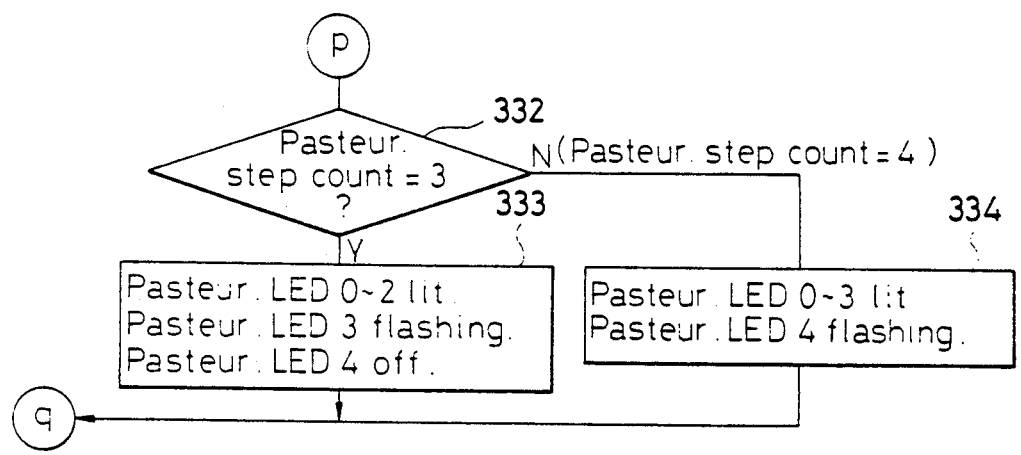
Figure 10:
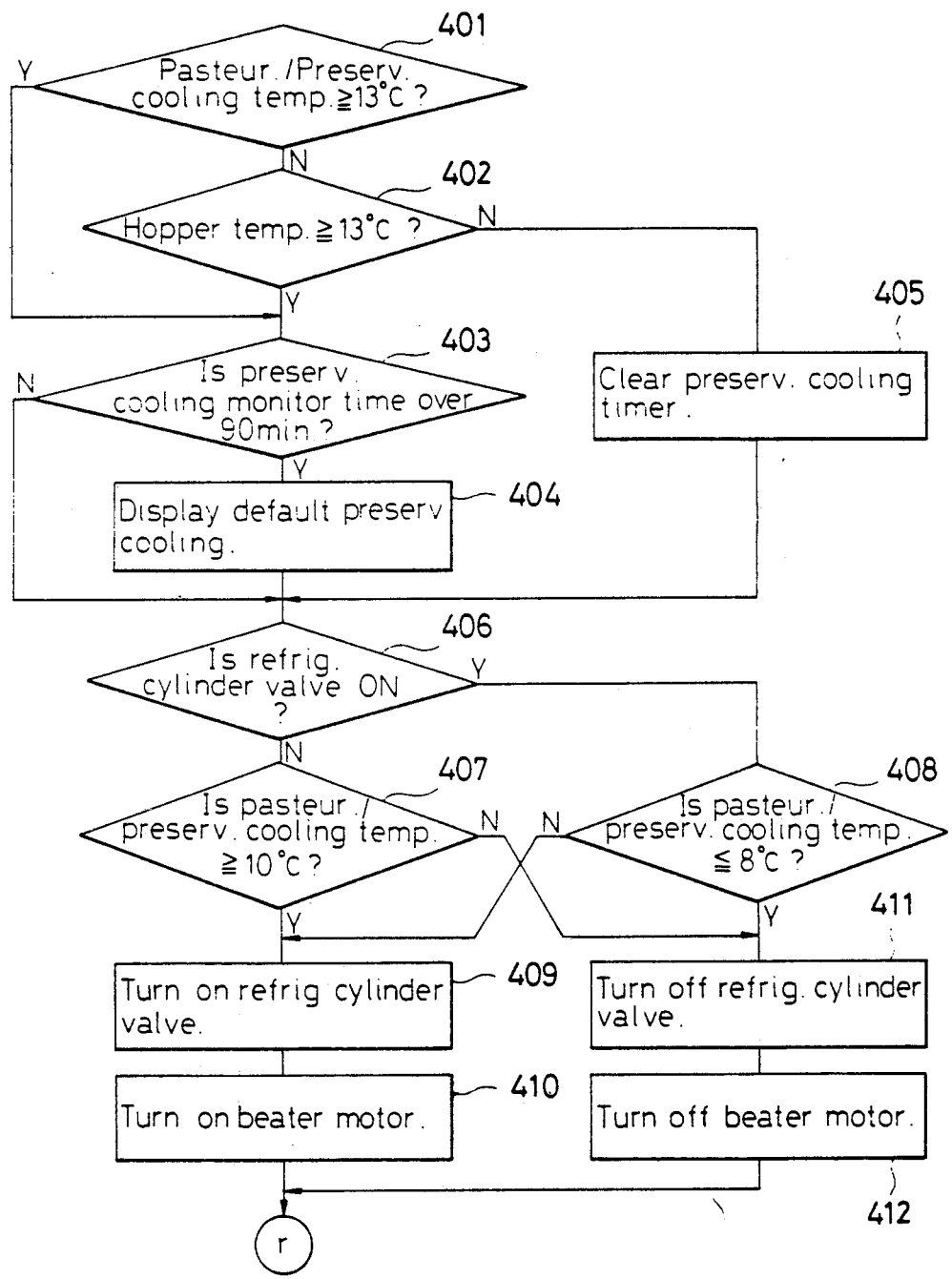
FIGS. 10 A, B and C illustrate the flow-charts for the preservation cooling operation.
Figure 10:
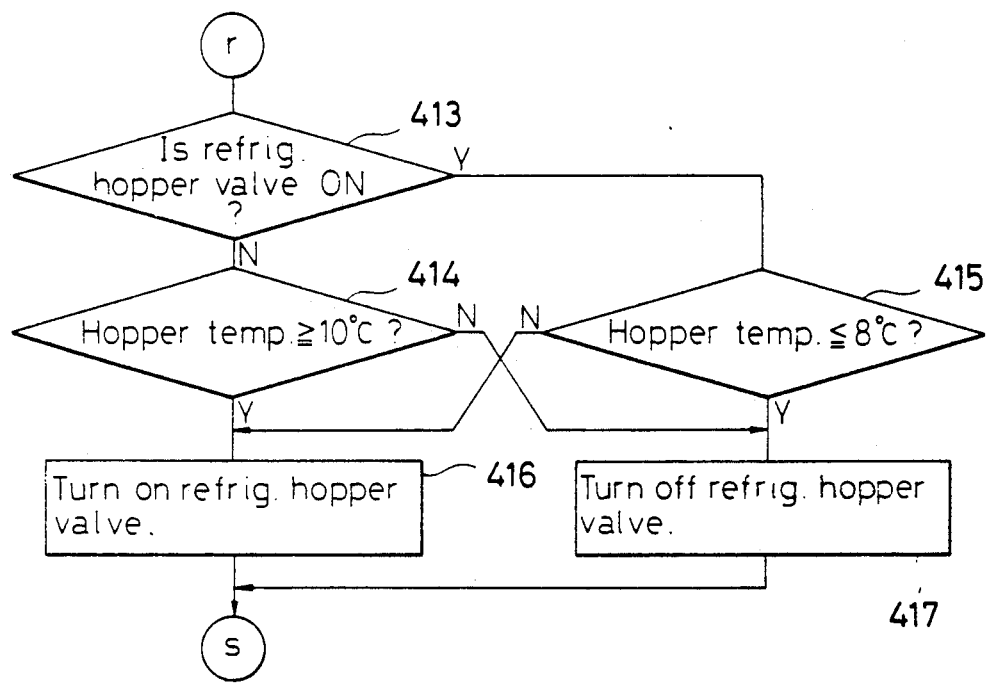
Figure 10:
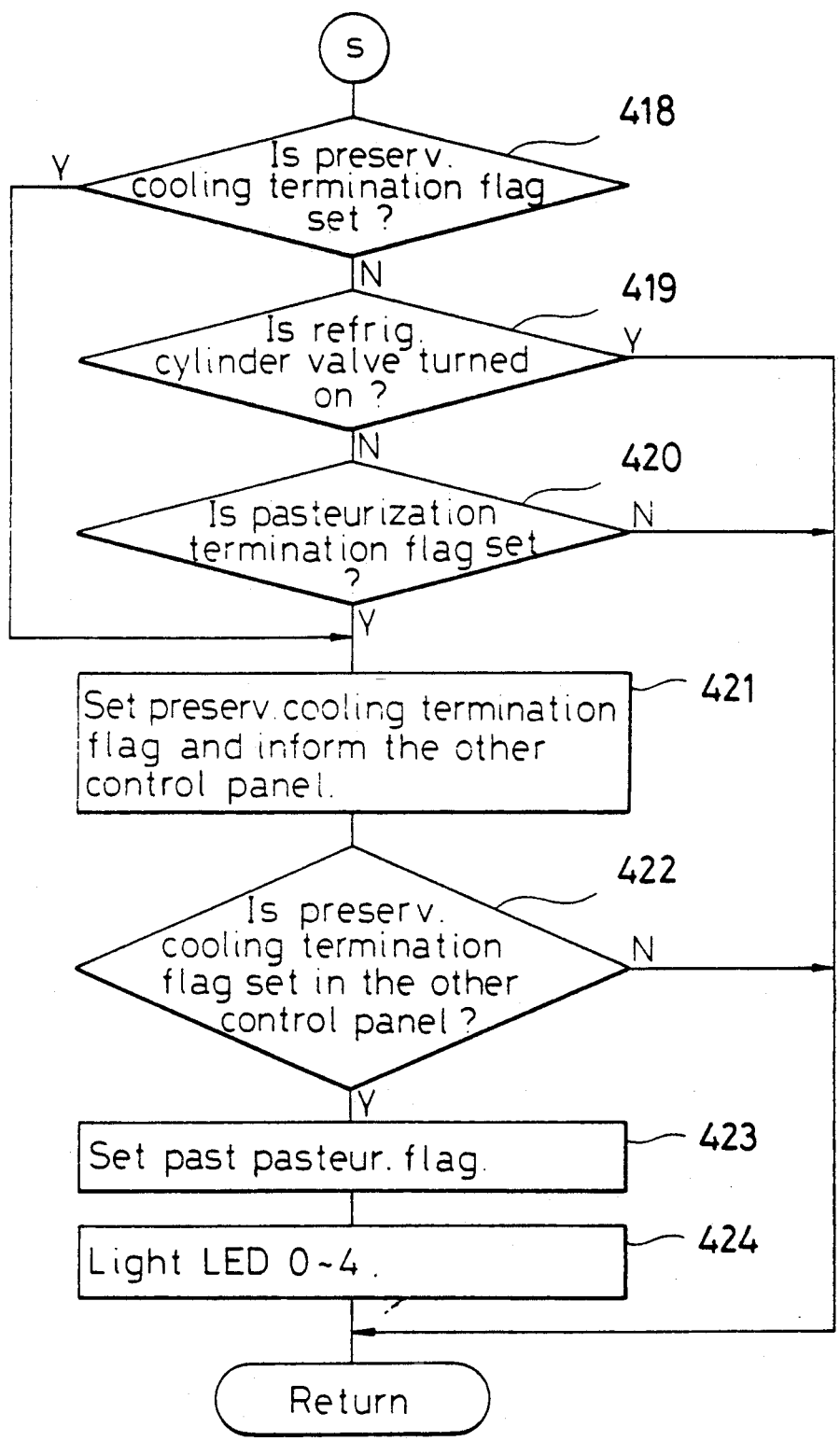
Figure 11:
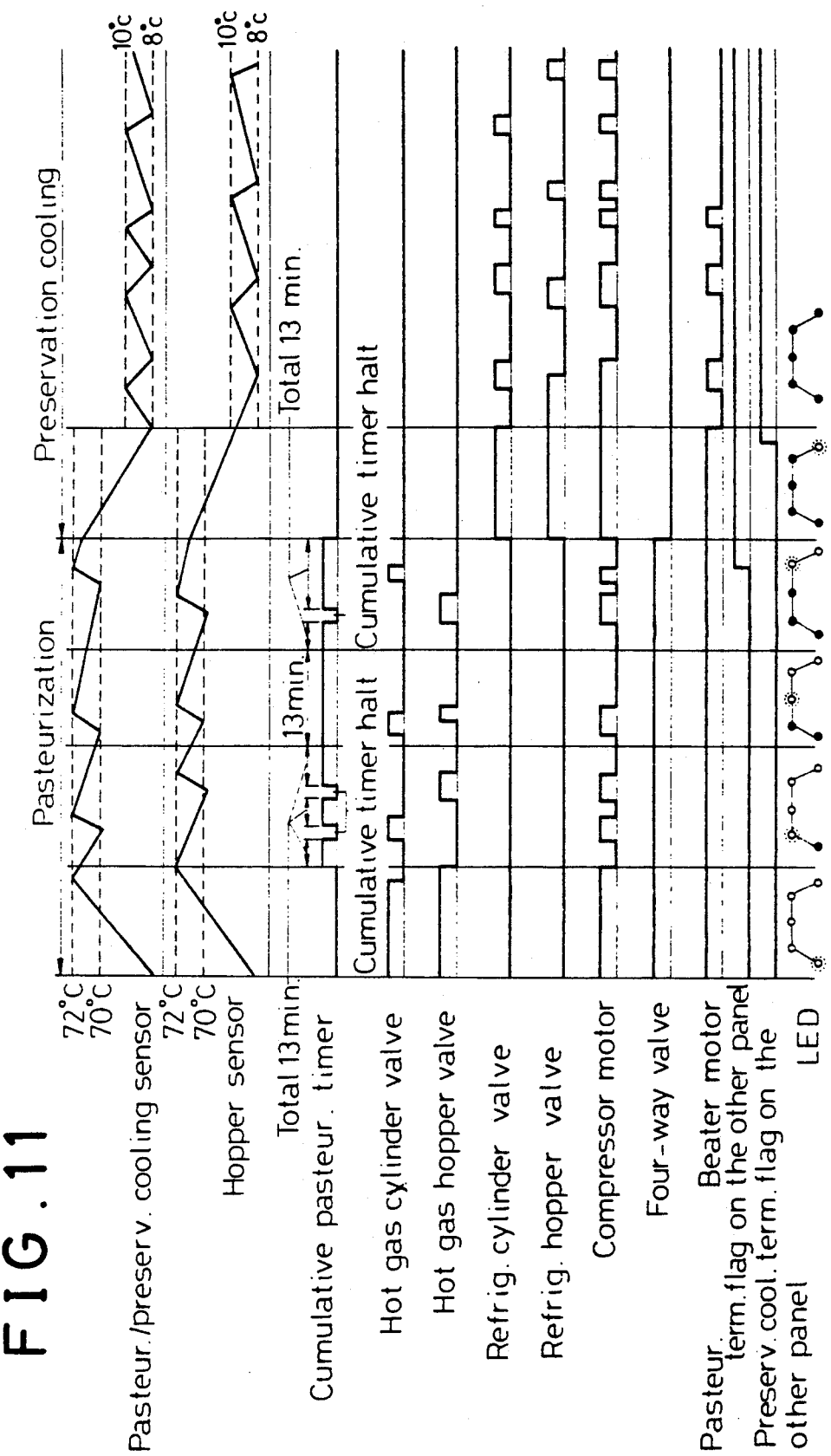
FIG. 11 is a timing chart for the pasteurization and preservation cooling operations shown in FIGS. 9 and 10.
Figure 12:
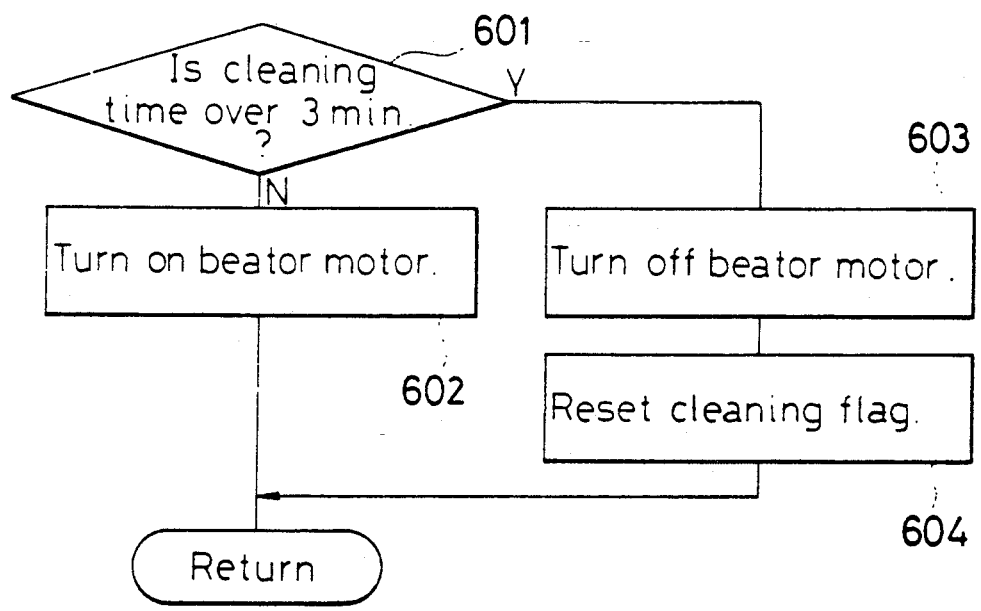
FIG. 12 is a flow-chart for cleaning operation.
Figure 13:
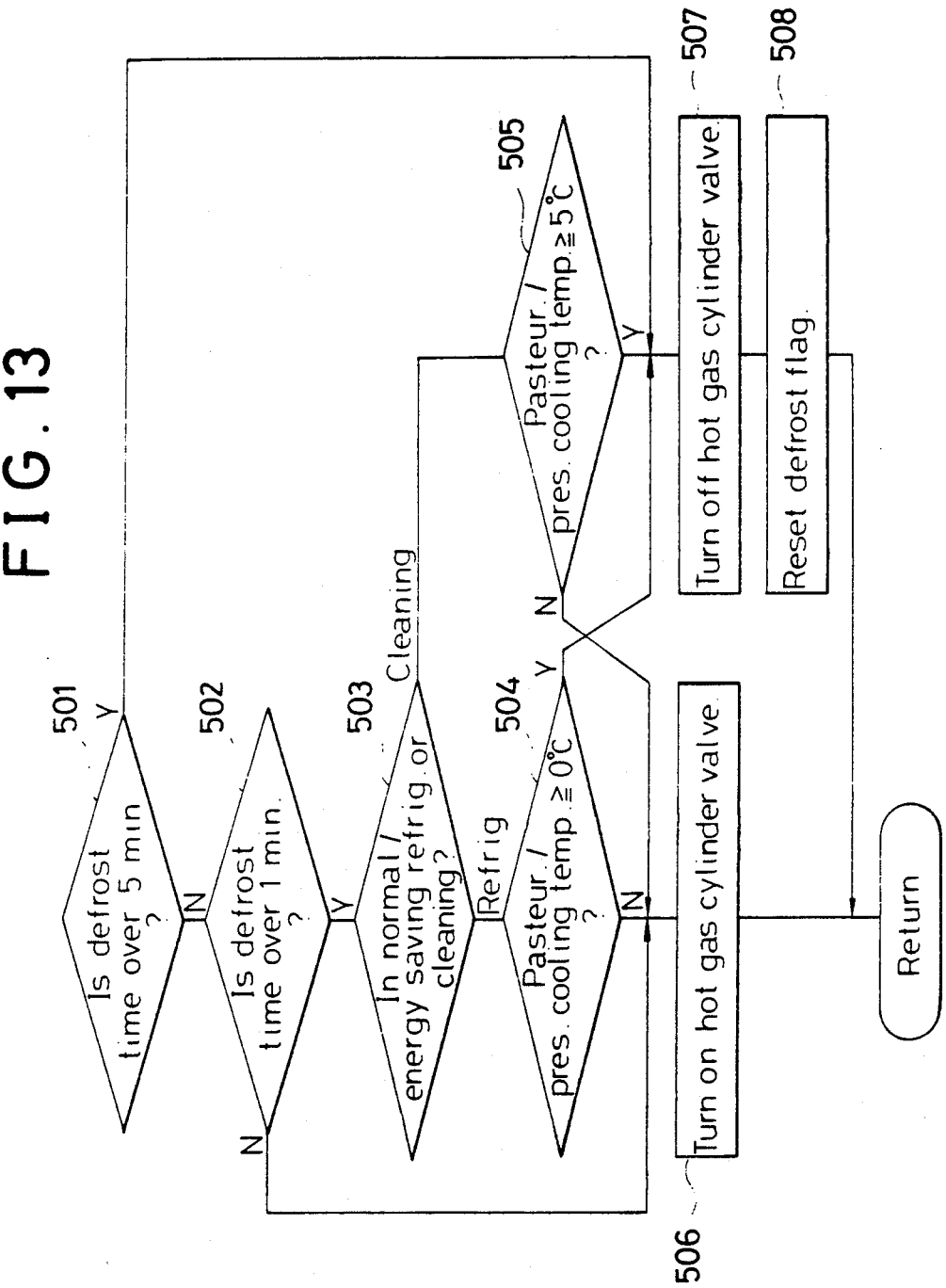
FIG. 13 is a flow-chart for defrosting operation.

The above protective operations (I) through (VII) are carried out under the control of the system controller of FIG. 5, which follows the main flow-charts shown in FIGS. 6 A~D. FIGS. 7 A~F illustrate the flow-charts of the normal and energy saving modes of refrigeration. FIG. 8 shows a timing chart for the related components. FIGS. 9 A~E show the flow-charts for the pasteurization. FIG. 10 A~C illustrate the flow-charts for the preservation cooling. FIG. 11 is a timing chart for the components participating in the pasteurization and the preservation cooling. FIG. 12 is a flow-chart for the cleaning. FIG. 13 is a flow-chart for the defrosting.

Figure 14A:
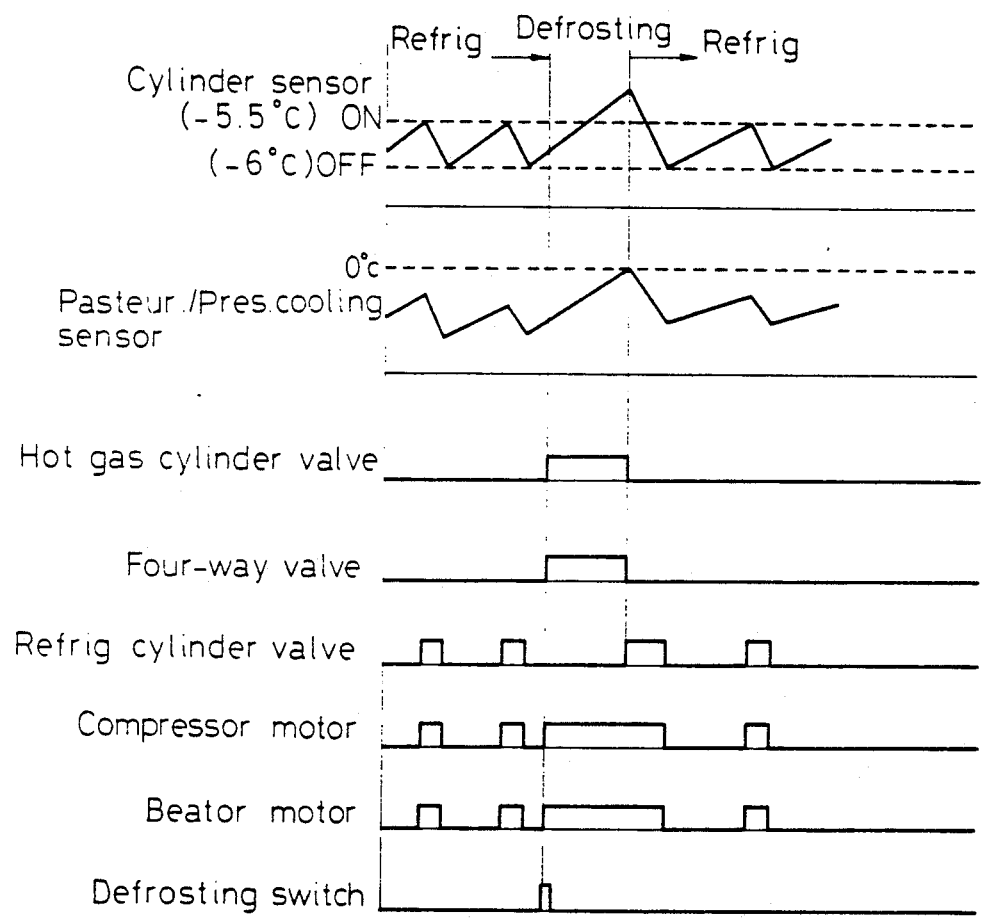
FIGS. 14 A and B together illustrate the timing charts for the defrosting in particular FIG. 14 A is a timing chart for defrosting operation for normal refrigeration, and FIG. 14 B is a timing chart for defrosting for cleaning operation.
Figure 14B:
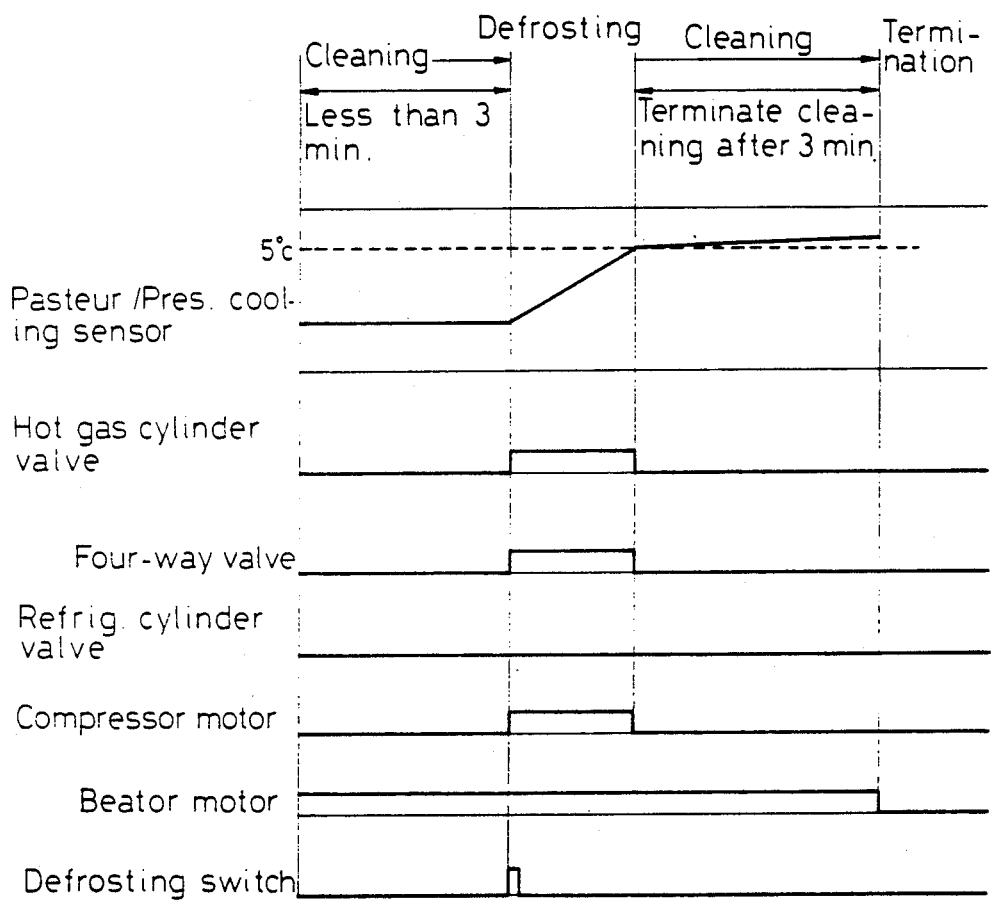
Figure 16:
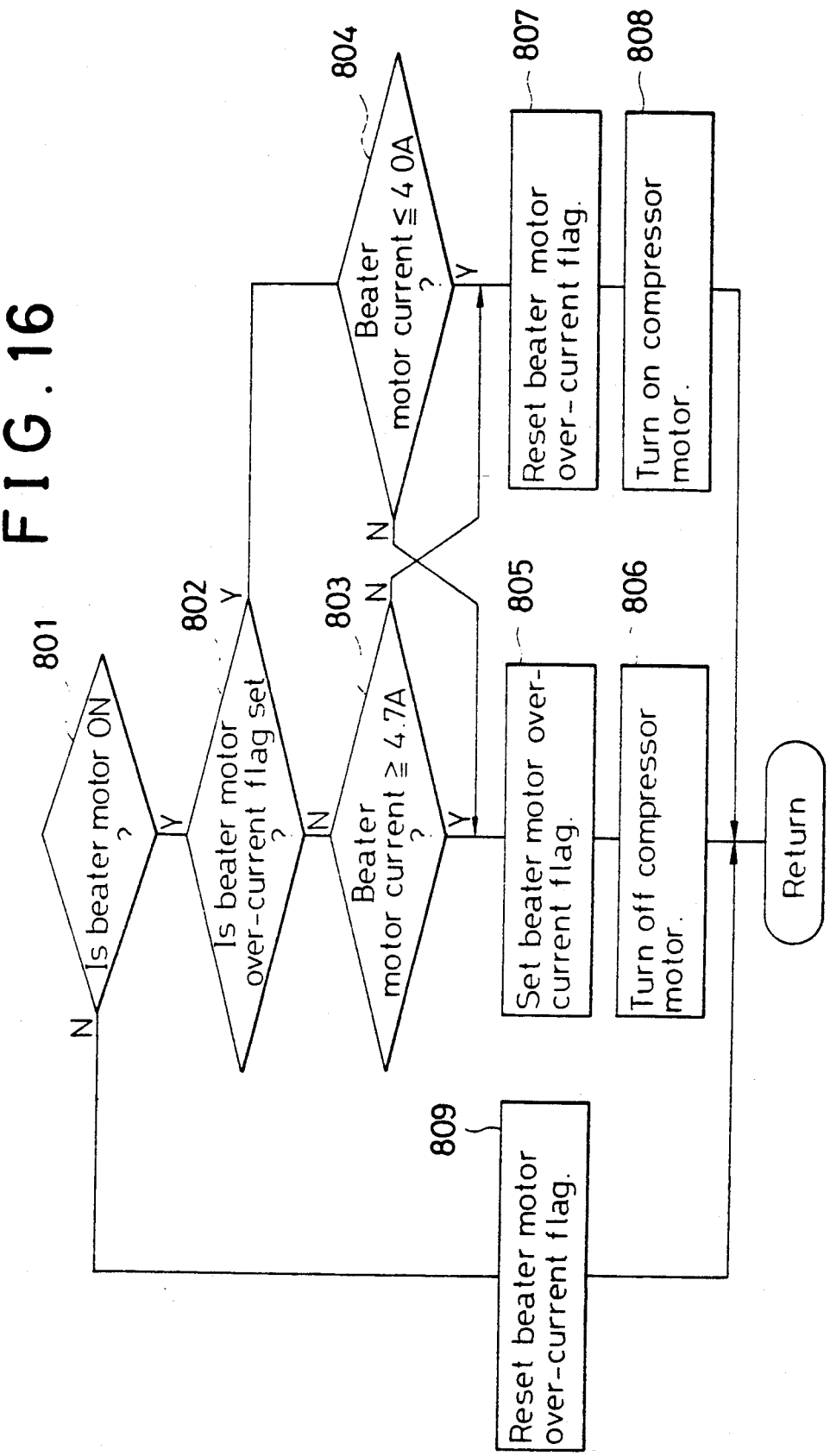
FIG. 16 is a flow-chart for protective steps to protect the motor from an over-current.
Figure 17:
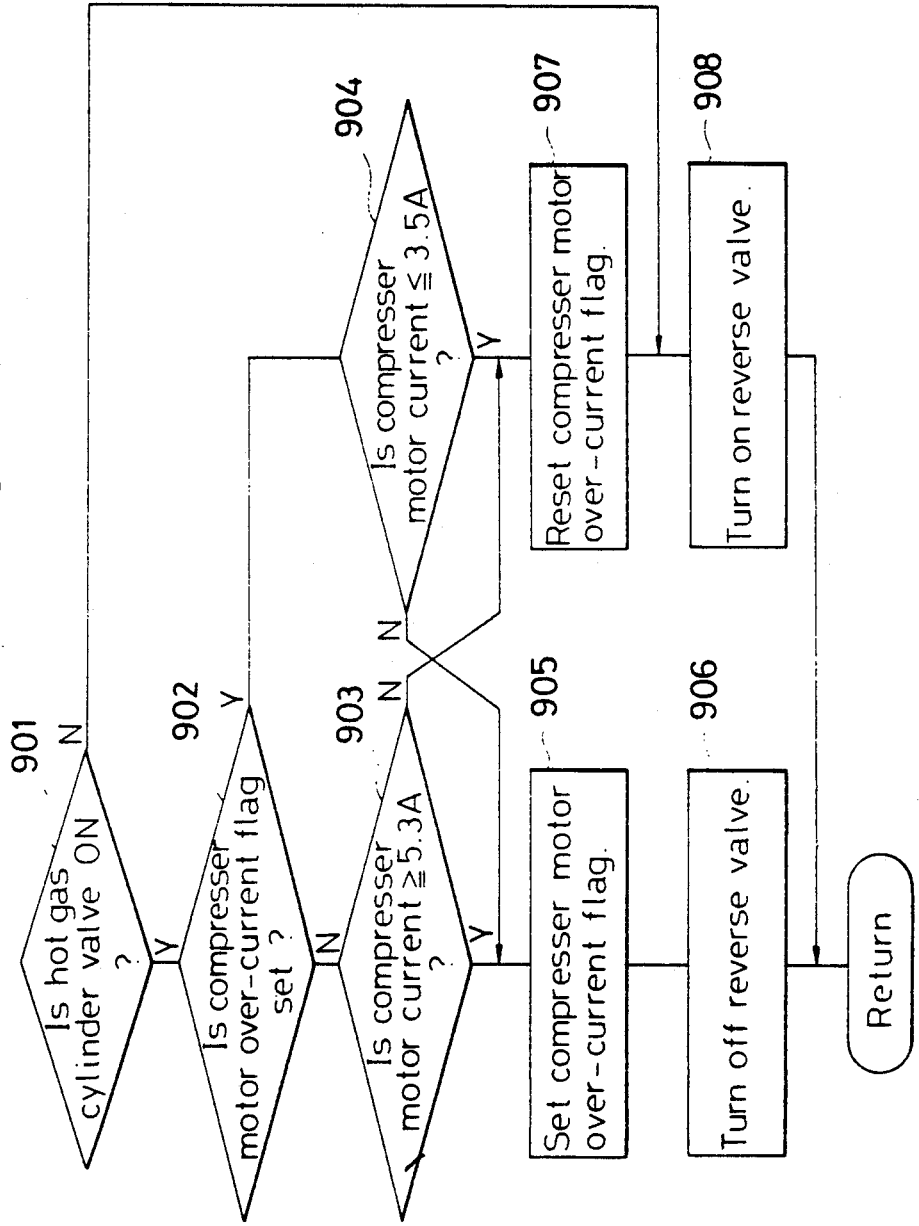
FIG. 17 is a flow-chart illustrating the control steps associated with the reverse valve.
Figure 18:
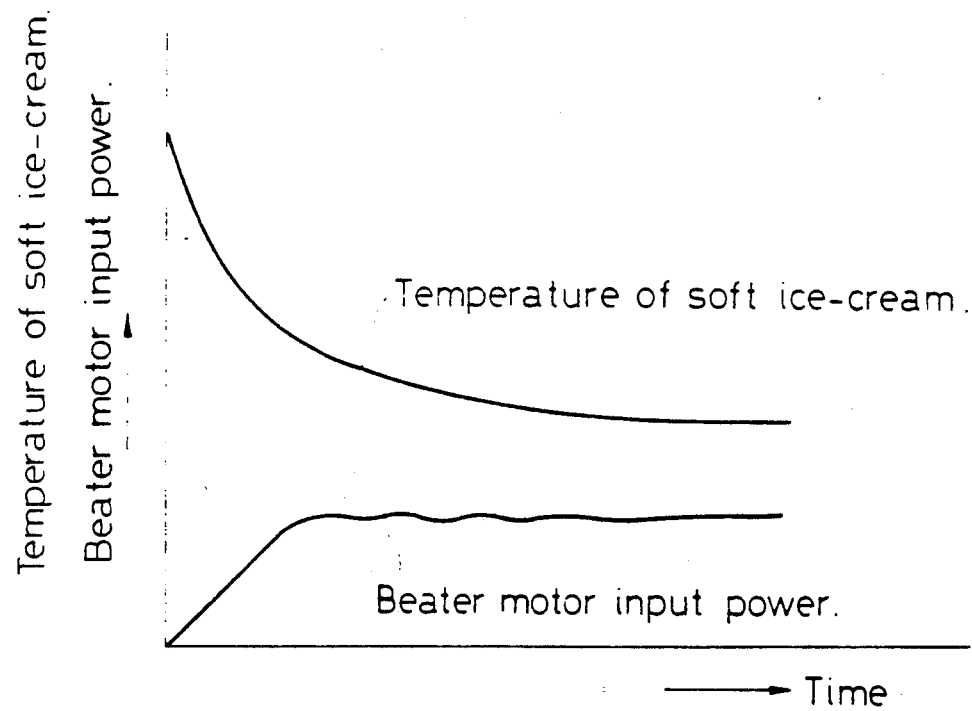
FIG. 18 illustrates the relationship between the temperature of the soft-ice-cream in the freezer and the refrigeration period, and the relationship between the input to the beater motor and the refrigeration period.

FIGS. 14 A and B altogether illustrate the timing charts for the components participating in the defrosting. FIGS. 15 A~B, FIG. 16, and FIG. 17 are respective flow-charts for the protection operation subsequent to the actuation of the four-way valve, the protection for the beater motor and the protection operation for the compressor by the reverse valve, respectively.

First, the main flow-chart of FIGS. 6 A~D are explained. In step 101, it is judged if the halt switch 57 is turned ON. If the answer is YES, all the flags are reset and all the on-going operations are halted (step 102).

If the answer is NO, then, it is further judged if either the operation switch 53 or the energy saving switch 54 is pushed (step 103). If the answer is YES, the pasteurization flag is then checked (104). If the flag is has not been set (NO), a normal/energy saving refrigeration flag is set and all the other flags are reset (105). If the pasteurization flag is set so that pasteurization is undergoing, the normal/energy saving refrigeration flag is not set. Coming back to STEP 103, if the answer is NO, a next judgement is exercised if the pasteurization switch 51 is turned ON (106). If the answer is YES, a further judgement is exercised if the mix is running out or not (107), and if the answer is NO, i.e. the mix is sufficient, the pasteurization flag is set and all the other flags are reset (108). If the mix is running out or the answer is YES, an instruction is made to indicate that the pasteurization is yet insufficient (109). In this case the pasteurization flag is not set. The insufficiency in pasteurization is indicated by the flashing of an alarm lamp 59 and by the 7-segment display 61 in a coded form. If the answer in STEP 106 is NO, then the control procedure proceeds to STEP 110 where the state of the cleaning switch 56 is checked (110).

If the switch is turned on (YES), then the pasteurization flag is checked (111). If the flag is not set (NO), the flag is set and all the other flag are reset (112). If the pasteurization flag is set, the flag is remains set. If in STEP 110, the answer is NO, it is asked if the defrosting switch 55 is turned on or not (113). If the switch is turned on (YES), then the pasteurization flag is checked (114) and, if the flag is not set (NO), the normal/energy saving refrigeration flag is checked (115). If either flag is set (YES), the defrosting flag is set (116).

These flags have the following effects. As a result of the normal/energy saving flag set (117), normal/energy saving flag set (117), normal/energy saving refrigeration is carried out (118), and if the flag is reset, the refrigeration is halted. As a result of the pasteurization flag set (119), pasteurization is carried out (120), and as the flag is reset, the pasteurization is halted. As a result of the refrigeration flag set (122), the refrigeration is carried out, and it is halted as the flag is reset.

Next, if the cleaning flag is set (123), the cleaning is carried out (124) and is stopped as the flag is reset. The defrost flag is checked in STEP 125. If the flag is set, the defrosting is carried out (126), and is halted as the flag is reset. After these steps, the protection operation (127) subsequent to the actuation of the four-way valve, overcurrent protection operation of the beater motor (128), and the control of the reverse valve (129) are executed.

In this main flow-chart, the judgement (107) and the process (109) provides the following advantage. The judgement that the mix is running out overrule over the decision that the pasteurization switch 51 be energized, so that, unless the amount of the mix is sufficient, instruction for the pasteurization is neglected. In this case the alarm lamp 59 is also turned on, indicating the pasteurization is not yet ready.

Figure 19:
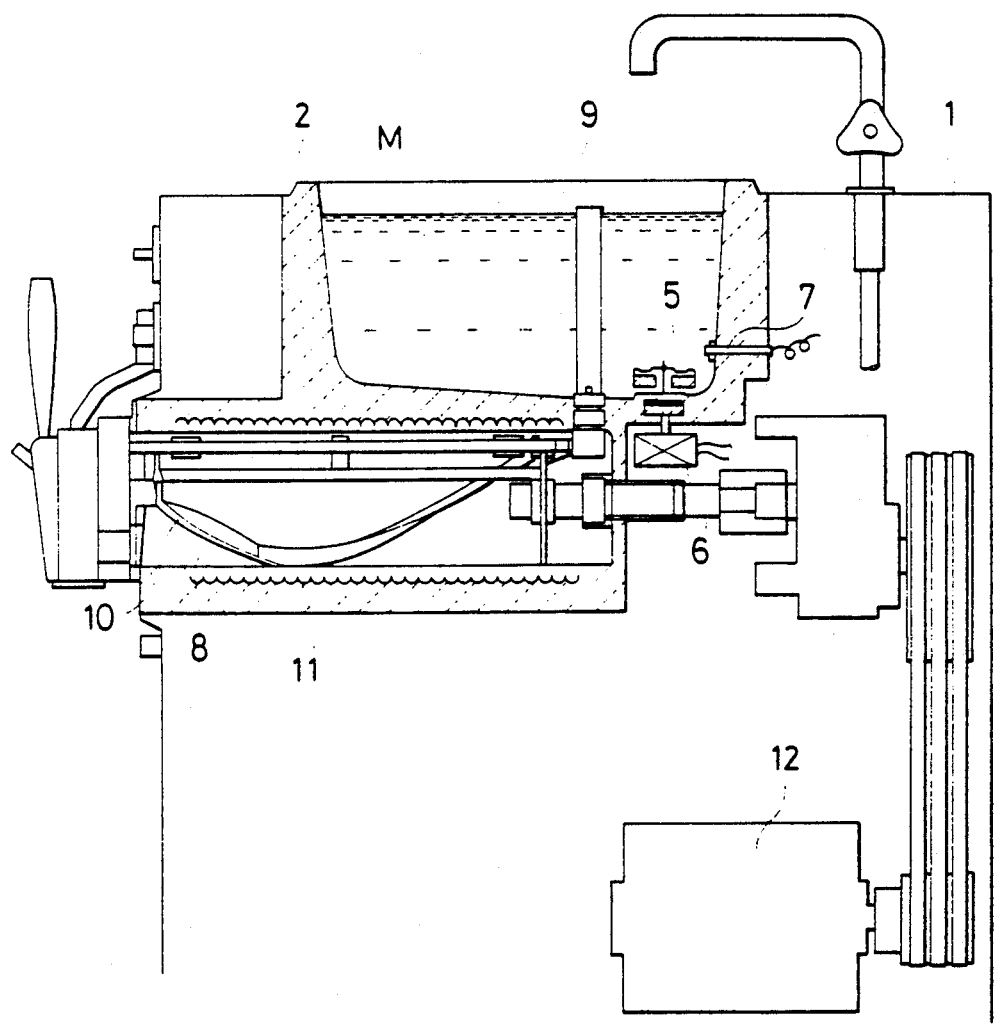
FIGS. 19 A and B illustrate the structure of the components for detecting insufficiency of the mix material in the hopper and for stopping the pasteurizing function of the hopper.
Figure 19B:
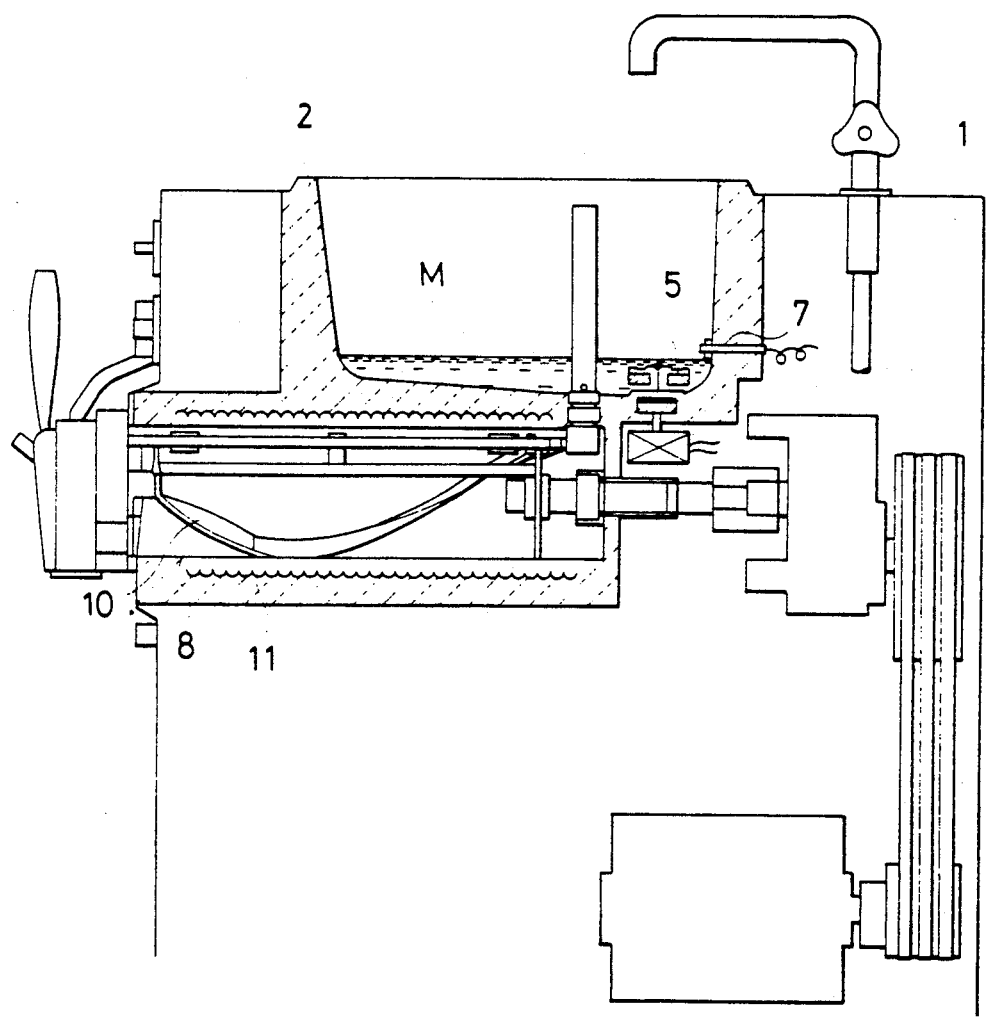

Unlike conventional control procedures, the above mentioned procedure will prohibit pasteurization independently of the amount of the mix, thereby preventing the mix M in the hopper 2, and hence the ice-cream, too, from becoming foamy. Change in material properties of ice-cream is also prevented by the above mentioned control. A specific example to provide this advantage is shown in FIGS. 19 A and B, in which a pair of electrodes or sensor 7 set at a predetermined height in the hopper 2 may detect the amount of the mix and tell the controller that pasteurization is ready or not because the mix conducts the electrodes only if the amount of the mix is sufficient to fill the gap between the electrodes as shown in FIG. 19 A.

The above mentioned procedure concerning the normal/energy saving mode of refrigeration follows steps shown in FIG. 7 A~F, with the timing shown in FIG. 8.

In STEP 201 a judgement is exercised whether or not the defrost switch 55 is energized during normal/energy saving mode refrigeration. If it is turned ON, a flag is set to effect defrosting operation. The defrosting proceeds, as explained in detail later, as shown in FIG. 13. If the switch 55 is not turned on, then it is judged in STEP 202 whether or not the cylinder is in a supercooled condition i.e. at temperature at or below $-20°$ C. as measured by the supercooling sensor 40 (203). If the temperature is found below $-20°$ C., it is asked whether or not there have been such supercooling conditions twice (204). If the supercoolings has taken place not more than twice, the number of supercoolings is counted (205), and supercooling defrosting flag is set (206). Namely, through STEPS 202-206 supercooling is circumvented that may happen during refrigeration by stopping the refrigeration and by starting defrosting.

In other words, when the supercooling sensor senses temperature of or lower than $-20°$ C. (203), the defrosting flag is set (206) as explained above. Upon the defrosting flag set, defrosting operation is performed once to eliminate supercooling, after which refrigeration is resumed. If supercooling begins again, the supercooling is counted in STEP 205 second time, and the supercooling defrosting flag is set (206) to give another defrosting. If it is judged that supercooling condition persists (204), i.e. if supercooling is counted three times, all the flags are reset and the refrigeration unit stops its operation (207).

If in STEP 203 the answer is NO, then a next judgement is made whether a preset-temperature flag is set or not (208). The preset-temperature flag is set when the actual temperature of the refrigeration cylinder is less than the preset temperature and the refrigeration cylinder valve 24 is turned ON for more then 30 minutes and the temperature detected by the cylinder sensor 31 is taken as the new preset temperature. In this way the first mode of the invention provides a protective measure to prevent abnormally prolonged refrigeration by shifting up the preset temperature. Thus, if the answer is YES in STEP 208, preset temperature is shifted in STEP 209. Therefore, refrigeration proceeds based on the newest preset temperature.

If the preset-temperature shift flag is not set, a judgement is exercised in STEP 210 whether the refrigeration is in normal mode or energy saving mode. If the normal refrigeration switch is turned ON, normal refrigeration mode is continued, while if the energy saving mode switch is turned ON, the energy saving mode is continued. In either mode, a judgement is made whether the preset temperature is for soft-ice-cream manufacturing or for shake manufacturing (211 and 212). If the switch 64 is set for the former, the preset temperature for soft-ice-cream is established (213 and 214) as specified by the operator, but otherwise the preset temperature for the shake is established (215 and 216). A next judgement is made whether a post-pasteurization flag is set (217). If the flag is set, the total number of ice-creams sold in the period from the time of the last pasteurization to the present and if it is judged in STEP 218 that the number does not exceed a certain predetermined number, 40 say, the preset temperature is lowered by $-0.2°$ C. than the specified preset temperature (219). If on the other hand the number exceeds 40, the post-pasteurization flag is reset (220), and no change in the preset temperature is made. The number of the ice-creams sold is counted by a switch associated with the discharge levers 16A, 16B, and 16C at the time of starting normal/energy saving refrigeration.

In this manner, by lowering the preset temperature until the sold number reaches a predetermined number (e.g. 40), semi-liquid condition of the mix after pasteurization is quickly remedied.

Next, whether the refrigeration cylinder valve 24 is turned ON or not is judged (221), and if it is turned ON, the cylinder valve 24 and the compressor motor 18M are kept turned ON (224) until the cylinder sensor 31 detects the temperature which is higher than the preset temperature by +0.5° C. (222 or 223). During the refrigeration the beater motor delaying timer is cleared (225), so that the beater motor is set in motion (226). As the cylinder sensor 31 senses the temperature lower than the preset temperature, the cylinder valve 24 will be turned OFF (227) until the sensor 31 senses the temperature +0.5° C. above the preset temperature based on the judgement (222 or 223) to stop refrigeration. If the cylinder valve 24 is turned OFF (stopping the refrigeration), supercooling count is cleared (228), and the beater motor delaying timer is initialized, which delays 5 seconds or 30 seconds the stopping of the beater depending on the type of the ice-cream, i.e. soft-type or shake-type (229). This 5 second is judged in STEP 230, during which the beater motor is kept in motion (230) for soft-ice-cream, and is stopped afterwards. Similarly, for shake the beater is kept in motion for 30 seconds (231) until 30 seconds lapses (233), and is stopped afterwards. The reason why the beater motor is not turned off simultaneously with the refrigeration cylinder valve 24 is that, since the refrigeration cylinder 8 is cooled sufficiently at the time the refrigeration unit is stopped, further beating is needed to prevent the mix from getting frozen hard on the wall of the cylinder, which makes it difficult to restart next beating. In short, STEPS that begins from 221 go through 226 and 231 and 232 deal with ON/OFF control of the refrigeration cylinder 24 and the beater motor 12. On the other hand subsequent STEPS that begins from 234 and go through 238 and 239 deal with ON/OFF control of the refrigeration hopper valve 26.

When the refrigeration cylinder valve 24 is turned ON (YES) (234), the refrigeration hopper valve 26 is always turned OFF (239). In other words the refrigeration cylinder valve 24 has a priority over the refrigeration hopper valve 26. In controlling the temperature of the hopper 2, the preset temperature for turning ON the refrigeration hopper valve 26 is set at or above 10° C. (238). If the refrigeration cylinder valve 24 is OFF (NO), and the temperature for turning OFF the refrigeration hopper valve 26 is set at or below 8° C. (239). In this case (with the refrigeration hopper valve 26 turned ON), the compressor motor 18M is also turned ON.

Subsequent judgement starting from STEP 240 concerns the procedure for shifting the preset-temperature based on the period of the refrigeration monitored. This procedure, which is one of the features of the invention, provides the basis for automatic adjustment or shifting of the preset refrigeration temperature performed in STEP208 and 209.

First, while the refrigeration cylinder valve 24 is turned ON (240), a refrigeration monitoring timer is turned on, but otherwise the timer is cleared (241). This timer is provided for monitoring the period of the refrigeration and judges if the present refrigeration has been continued for more than 30 minutes. If it has, then a measurement of the temperature is made by the cylinder sensor. If the temperature is 0° C. or below, the detected temperature is employed as a new preset temperature (245) for the subsequent 30 minutes and clears the timer. After 30 minutes (244), a preset-temperature shift flag is set (244) if the temperature then detected is below 0° C. (243). If in STEP 243 the cylinder sensor detects 0° C. or a higher temperature, the controller emits abnormality signal to stop all the undergoing operations (247). If, under a predetermined period of refrigeration, the cylinder temperature does not come to the preset temperature, then it is desirable to shift the preset temperature to the detected temperature in continuing the refrigeration, so that due control may be restored in the next step of the control. This permits circumventing continued refrigeration based on a seemingly unattainable low temperature standard, and preventing an overload on the compressor 18, thereby extending the life-time of the apparatus.

Pasteurization proceeds in steps as shown in FIGS. 9 A ~ E. The timing of the components involved in the pasteurization is shown in FIG. 11.

During pasteurization the beater motor 12 and the four-way valve 19 are kept in motion (301). In order prevent the mix from being degenerated due to heat, the pasteurization monitor timer measures pasteurization time and judges whether 2 hours have passed since the pasteurization was initiated (302). Thus, after 2 hours, the controller issues pasteurization-insufficiency alarm (303) and reset the pasteurization flag (304), and refrigeration is resumed. If the answer is NO in STEP 302, a next judgement is exercised whether the hot gas cylinder value 34 is turned ON (305), and the valve 34 is turned OFF (308) if the temperature detected by the pasteurization/preservation cooling sensor is above 72° C. (306,307), but the valve is turned ON (309) if the temperature is below 70° C. When the hot gas cylinder valve 34 is turned ON, the compressor motor 18M is also turned ON. In the next STEP 310, the condition of the hot gas hopper valve 35 is checked. If the hot gas hopper valve 35 is turned ON and if the hopper temperature is above 72° C. (311, 312), the hot gas hopper valve 35 is turned off (313), but if the hot gas hopper valve 35 is turned OFF and the hopper temperature is below 70° C., the valve is turned ON (314). Then the compressor motor 18M is also turned ON.

Use is made of a pasteurization step counter to divide the pasteurization process into five successive steps, numbered 0 through 4, respectively, which numbers are displayed in turn to indicate which step the pasteurization process is in. The pasteurization timer mentioned above is a 13-minute timer, which measures cumulative time, in unit of 13 minutes, of pasteurization at temperatures above 70° C. as measured by the pasteurization/preservation cooling sensor and the hopper sensor. The timer does not sum up the time during which the temperature is below 70° C. When the pasteurization is started, the hot gas cylinder valve 34 and the hot gas hopper valve 35 are turned ON. Since the pasteurization is not in step 4 at the beginning, the answer is NO in STEP 315. Since pasteurization is not in STEP 1 either, the answer in STEP 316 is also NO, and the pasteurization is found out to be in step 0 (319) and pasteurization LED 0 is flashed unless the hot gas cylinder valve 34 and the hot gas hopper valve 35 are both turned OFF in STEPs 317 and 318, i.e. until pasteurization/preservation cooling sensor 38 and the hopper sensor 32 both sense temperatures above 72° C., when the pasteurization step counter counts one step (count 1) in STEP 321. If the answer is YES in STEP 316, then a next judgement is exercised in STEPs 322 and 323 whether the temperature of the refrigeration cylinder and the hopper, as measured by the pasteurization/- preservation cooling sensor, are above 70° C. If the temperatures are both above 70° C., then a further judgement is exercised whether the time of duration above 70° C. has elapsed 13 minutes (324). If the time is short of 13 minutes, the timer counts cumulative time of pasteurization above 70° C. (325). Since the count registered in the pasteurization counter is still 1 (326), the pasteurization LED 0 is lit and LED 1 is set flashing, and the remaining LED's 2–4 are turned OFF (327). As the cumulative time becomes 13 minutes, the timer now counts 2 (328) and clears the pasteurization timer (329). Based on the judgement (330) that the registered count of the pasteurization step counter is 2, the pasteurization LED 0 and 1 are lit, LED 2 set flashing, with LED's 3 and 4 set OFF (331). Similar sequences of judgements, beginning from STEP (332), proceeds through STEPs 333 and 334 for the pasteurization steps 3 and 4 for the subsequent 13-minute pasteurization operations. In the final pasteurization step 4, the pasteurization LED's 0–3 are lit without flashing and LED 4 is set flashing. When the last 13-minute pasteurization operation is over (315), a pasteurization termination flag is set. This information is transmitted to the other control panel 70B (335). Similarly, pasteurization heating of the refrigeration cylinder 8B and the hopper 2B belonging to the other refrigeration unit is also undergoing simultaneously. As the pasteurization termination flag is set in the other unit, that information is also transmitted to the control panel 70A. As it is judged that the pasteurization processes are completed for both refrigeration cylinders (336), a pasteurization flag is set as well as a flag (304) for restarting preservation cooling, which completes all the pasteurization procedure, and resumes the preservation cooling.

It should be noted that the the sequence of the decisions and the judgements (335), (336), and (304), characterizing the invention, gives the following advantage. As previously stated, there is provided a central discharge outlet having a lever 15C and communicating through discharge pipes 17C (FIG. 2) with the right and left cylinders 8A and 8B. Therefore, if the right and left refrigeration cylinders 8A and 8B are given pasteurization independently, as is the case in conventional ice-cream manufacturing apparatuses, the central plunger 15 might be subject to heating on one side and refrigeration on the other side, which may cause insufficient pasteurization of the central plunger 15. The communication between the right and left control systems mentioned above will prevent this inconsistency by resetting the pasteurization flags only after pasteurization procedures are completed in both refrigeration units.

Refrigeration proceeds in steps as outlined in FIGS. 10 A~C.

By means of the pasteurization/preservation cooling sensor and the hopper sensor, the temperatures of the refrigeration cylinder and the hopper are measured. If the temperatures are above 13° C. (401 and 402), and if at least one the temperature is above 13° C., a default monitoring timer is actuated to monitor the duration of time in which the temperature is above 13° C. If the duration is more than 90 minutes in total (403), an indication that preservation is default is output (404). This monitoring is based on the criterion that under normal refrigeration conditions the temperature will be lowered below 13° C. within 90 minutes after the refrigeration units is "pulled down" or started subsequent to pasteurization. The default monitoring timer is cleared (405). If the temperatures of the refrigeration cylinder and the hopper measured by the pasteurization/preservation cooling sensor and the hopper sensor become lower than 13° C. within 90 minutes.

Next, a judgement is exercised whether the refrigeration cylinder valve is turned ON or not (406), and, based on the judgments (407, 408), the refrigeration cylinder valve and the beater motor are turned ON (409, 410) if the associated temperatures are below 10° C., which will be turned OFF when the temperatures become below 8° C. (411, 412), thereby constituting ON/OFF control of the refrigeration cylinder valve. The compressor motor is also turned ON or OFF in accordance with the ON/OFF of the refrigeration cylinder. In STEP 413, the ON/OFF state of the refrigeration hopper valve is judged. If the temperature measured by the hopper sensor is above 10° C. (414, 415), the refrigeration hopper valve is turned ON (416), which will be turned OFF as the temperature becomes below 8° C., thereby constituting ON/OFF control of the refrigeration hopper valve. The compressor motor is also turned ON or OFF in accordance with the ON/OFF state of the refrigeration hopper valve. In the next STEP 418 a judgement is exercised if the refrigeration termination flag is set. If the flag is not set, then it is set in STEP 420, provided that the refrigeration cylinder valve is not turned OFF (419). If on the other hand the flag is set, it is informed to the control panel 70B (421). The next STEP 422 judges if a similar refrigeration termination flag is transmitted from the controller 70B, and if it has, the post pasteurization flag is set (423), and all the LED 0–4 are turned ON (424). In short, the sequence of steps which starts from STEP 418 and ends at STEP 424 constitutes a procedure for judging the completion of the refrigeration and for communication between the counter part control unit.

The procedure for the defrosting operations in accordance with the invention is carried out as described in the flow-chart of FIG. 13. The timing of the associated components involved in defrosting the cylinders during refrigeration and cleaning are outlined in FIGS. 14A and B, respectively. In a defrosting operation the duration of the defrosting operation is monitored by the defrosting timer. During a defrosting operation the hot gas cylinder valve is maintained in ON state (506) until the first 1 minutes is counted by the defrosting timer (501 and 502). After 1 minute, if the refrigeration is in the normal/energy-saving refrigeration mode (503), the hot gas cylinder valve 34 is turned OFF (507) and defrosting flag is reset (508) to end the defrosting when the pasteurization/preservation cooing sensor senses temperature above 0° C. (504), thereby regenerating the ice-cream, i.e. defrosting the ice-cream once to a temperature near 0° C. and subsequently freezing it again to recover proper hardness. An excessive freezing of the mix under long time refrigeration is avoided by means of the defrosting switch 55. * The above mentioned procedure is not performed after the defrosting timer counted 5 minutes (501).

If instead the operation is judged to be in 'cleaning' mode in STEP 503, defrosting operation is continued until the temperature becomes 5° C. (as measured by pasteurization/preservation cooling sensor in STEP 505), when the hot gas cylinder valve is turned OFF (507) and the defrosting flag is reset (508). In this mode the mix is heated to a temperature higher than the defrosting temperature employed during refrigeration so that the ice-cream mix is sufficiently softened and removed easily out of the refrigeration cylinder.

It is should be born in mind that while the hot gas cylinder valve 35 is turned ON the compressor motor 18M is also turned ON.

The cleaning procedure is executed as outlined in the flow-chart of FIG. 12.*

Until 3 minutes is counted by the cleaning timer (601), the beater motor is kept in motion (602). After 3 minutes the motor is turned OFF (603) and the cleaning flag is reset (604) to finish the cleaning operation.

Figure 15A:
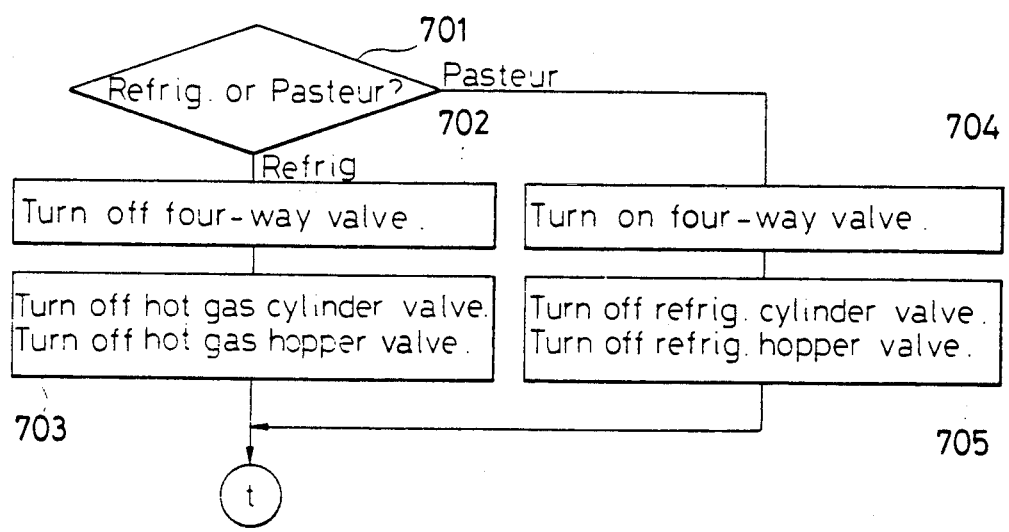
FIGS. 15 A and B are the flow-charts for protective steps subsequent to the actuation of the four-way valve.
Figure 15B:
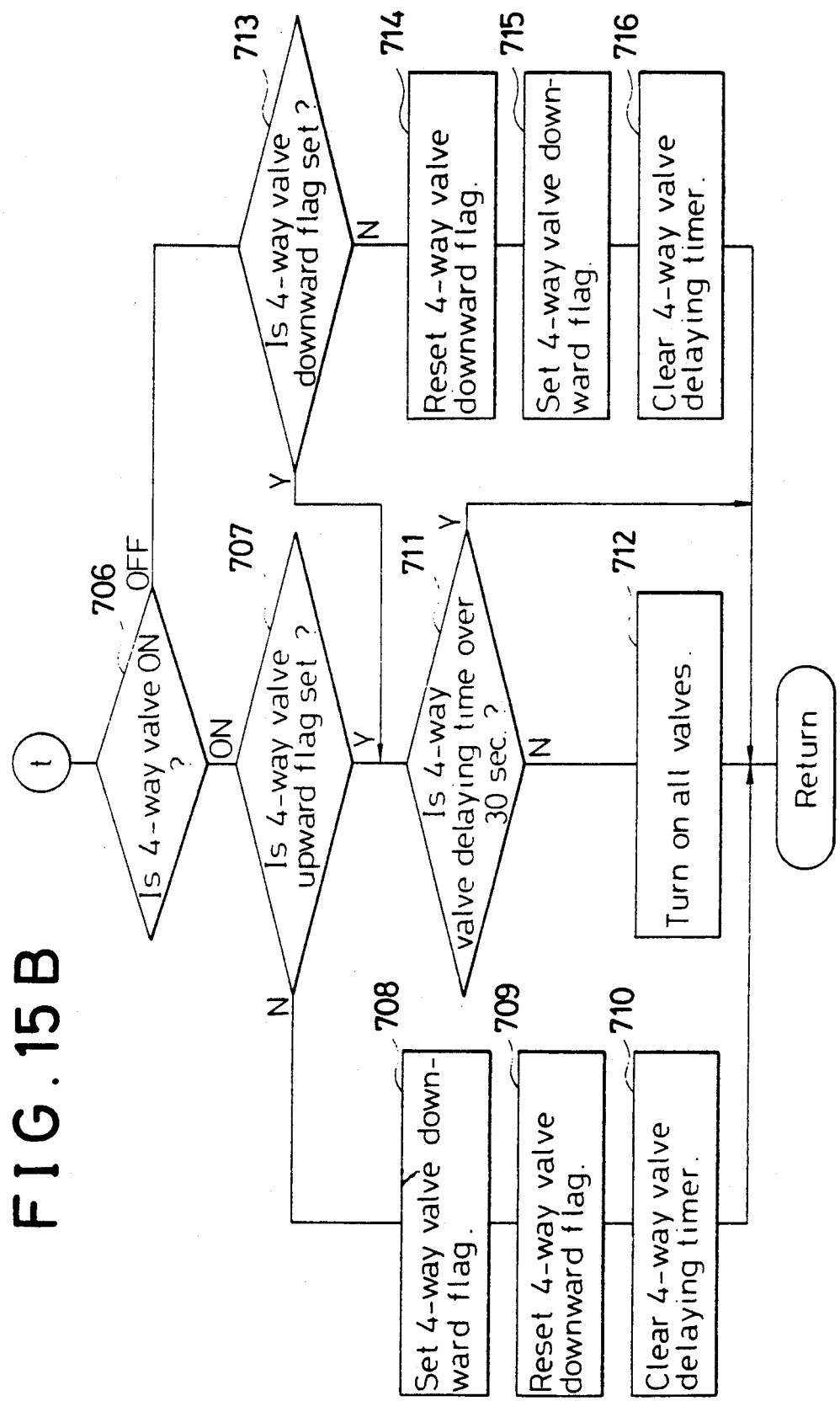

The protective operation subsequent to the actuation of the four-way valve proceeds as outlined in the flow chart of FIGS. 15A and B.

In addition to the four-way valve, the apparatus of this invention includes various electromagnetic valves (for controlling the refrigerant gas and the hot gas), a reverse valve, as mentioned earlier. The four-way valve is provided for switching the flow of the refrigerant gas when the refrigeration cycle is switched to the heating cycle and vice versa. The protective operation described below will prevent sudden trapping of the refrigerant, and resultant noises also, in the pipes between the electric valves and the reverse valve that may happen immediately after the actuation of the four-way valve. This protective operation is performed by opening the electric valves to relieve the pressure in the pipes.

To do this a judgement is exercised in STEP 701 whether the refrigeration unit is performing refrigeration or pasteurization. If the unit is in refrigeration operation, the four-way valve is turned OFF (702); the refrigeration cylinder valve 24 and the refrigeration hopper valve 26 are turned ON; and the hot gas cylinder valve 34 and the hot gas hopper valve 35 are turned OFF (703). If the unit is in pasteurization operation, the four-way valve is turned ON (703); the refrigeration cylinder valve 24 and the refrigeration hopper valve 36 are turned OFF; and the hot gas cylinder valve 34 and the hot gas hopper valve 35 are turned ON (705). When the four-way valve 19 is turned ON, a four-way valve upward flag is set (708), while a four-way valve downward flag, which was set in a STEP discussed shortly, is reset (709) and a four-way valve delaying timer is cleared (710). When the four-way valve is in ON state (706) and as a consequence the four-way valve upward flag is set (708), the answer is YES in STEP 707, so that all the valves are turned ON (712) and remain so for 30 seconds until the four-way valve delaying timer counts 30 seconds (711) after the actuation of the four-way valve. In a similar fashion, when the four-way valve 19 is turned OFF to switch the operation from pasteurization to refrigeration, the four-way valve upward flag is reset (714) as a result of the judgement in STEPs 706 and 713; the four-way valve downward flag is set (715); and the four-way valve delaying timer is cleared (716). Since the four-way valve is now turned OFF (706) and four-way valve downward flag is set, the answer is YES in STEP 713, so that, if 30 seconds has not passed yet (711), all the valves are kept in ON states (712). This implies that immediately after the four-way valve 19 is turned ON or OFF the refrigeration cylinder valve 24, the refrigeration hopper valve 26, the hot gas cylinder valve 34, and the hot gas hopper valve 35 are all kept in ON states for 30 seconds by means of the four-way valve delaying timer.

The procedure for the beater motor over-current protection is carried out in a manner outlined in the flow-chart of FIG. 16.

First, the condition of the beater motor is judged in STEP (801). If the motor is turned OFF, a beater motor over-current flag is reset (809). If the motor is turned ON, a judgement is made wheter the beater motor over-current flag is set (802). If the current through the motor is more than 4.7 A the beater motor over-current flag is set (805) and the compressor motor 18M is turned OFF (806). If the current is less than 4.2 A, the flag is reset (807) and the compressor motor 18M is turned ON (808). This procedure will prevent an over-current due to a large load required for the beater motor to scrape the frozen ice-cream off the inner wall of the cylinder that would be deposited on the wall if the beater motor were stopped immediately after the measurement of the over-current of the beater motor. That is why only the refrigeration is stopped and the beater motor is kept running even after the detection of the beater motor over-current. The beater motor is stopped only after a uniform temperature is established in the cylinder. In this way the above operation protects beater motor from overloads at the time of restarting beating and allows the apparatus to provide ice-cream in a steady and favorable condition.

The operation of the reverse valve 36 is shown in the flow-chart of FIG. 17. This involves a judgement 901 for distinguishing the state of the hot gas cylinder valve. If the valve is in ON state, and if an over-current greater than 5.3 A (903, 904) is flowing through the motor (902), the compressor motor over-current flag is set (905), and the reverse valve 36 is turned OFF (906). If the current is less than 3.5 A, the flag is reset (907), and the reverse valve 36 is turned ON (908). Thus, unlike prior art in which a hot gas is returned to the compressor towards the end of pasteurization heating, this procedure may protect the compressor by gradually decreasing the amount of the hot gas returning to the compressor hot as the pasteurization operation approaches its end.

We claim:

1. In an ice-cream manufacturing apparatus having at least one cylinder for beating the ice-cream mix provided from a hopper into a said cylinder, and at least one refrigeration unit for cooling the cylinder at a preset temperature, said apparatus including a controller means comprising:
   timer means for controlling the continuous operation of said at least one refrigeration unit for a predetermined time period;
   means for measuring the temperature of the ice-cream mix in the cylinder at the end of said period;
   means responsive to a measured temperature above a said preset temperature for correcting the preset temperature to a new preset temperature by increasing said preset temperature at the end of said period; and
   means for controlling the operation of said at least one refrigeration unit based on said correction preset temperature.

2. The ice-cream manufacturing apparatus as set forth in claim 1, wherein said controller means further comprises:
   means for controlling the operation of mix beating means provided in the cylinders and controlling said at least one refrigeration unit so as to prepare in the cylinders of the mix having desired temperature and softness;

means for detecting the electric current through electric motor means for driving said mix beating means; and means for judging said detected electric current and, based on the judgment, for stopping refrigeration of the refrigeration cylinder without stopping the associated beating means if the current of the associated motor means exceeds a predetermined current level.

3. An ice-cream manufacturing apparatus as in claim 1 wherein the corrected preset temperature is the temperature measured by said measuring means.

4. An ice-cream manufacturing apparatus as in claim 3 wherein said controller means corrects the preset temperature only in reponse to a measured temperature below a predetermined value.

5. An ice-cream manufacturing apparatus having a plurality of ice-cream manufacturing units, each said unit having a hopper for storing a mix, a refrigerated cylinder for cooling and beating said mix supplied from said hopper; an ice-cream discharger provided for each cylinder and one for a pair of said cylinders; a refrigeration unit associated with a refrigerant circuit for refrigerating the cylinder and hopper of a manufacturing unit during an ice-cream freezing process and for heating said cylinder and said hopper during a pasteurization process, comprising:

temperature detection means for detecting the temperatures of said cylinders and said hoppers of each of said manufacturing units;

controller means for controlling the operation of each ice-cream manufacturing unit based on the temperatures detected by said temperature detection means, and for carrying out said heating; and means for communicating between said plurality of manufacturing units the information regarding the pasteurization process in each manufacturing unit, and for terminating said pasteurization processes only after said heating is completed in all of the cylinders.

6. An ice-cream manufacturing apparatus as set forth in claim 5, further comprising:

pasteurization heating means for pasteurizing said ice-cream manufacturing units by circulating a hot gas or by switching the flow of the refrigerant through said refrigerant circuits;

mix level detectors mounted in each of said hoppers for detecting predetermined levels of the mix therein; and means for indicating that the hopper having a detected mix level below said predetermined level is not ready for pasteurization, and at the same time disabling said pasteurization heating means.

7. An ice-cream manufacturing apparatus as set forth in claim 5, further comprising for each of said manufacturing units:

a compressor motor current detector for detecting the current through the motor of a compressor in said refrigerant circuit which is switched to serve as a heating cycle circuit with said hot gas or refrigerant circulating throught said compressor and said hopper;

a reverse valve provided in said heating cycle circuit and connected, immediately before the compressor, in parallel with a decompression means in said refrigerant circuit; and a reverse valve controlled by said compressor motor current detector.

8. An ice-cream manufacturing apparatus as set forth in claim 5, wherein said ice-cream manufacturing unit comprises a refrigerant circuit having a compressor, a condenser, and a refrigeration unit mounted on said refrigeration cylinder, said refrigeration circuit further comprising:

a four-way valve for forming a hot gas cycle within said refrigerant circuit;

electromagnetic valves for use in refrigeration operations and electromagnetic valves for use in heating operations in controlling the flow of liquified refrigerant and said hot refrigerant gas, respectively, that flow through said refrigeration cylinder and hopper; and means for opening said electromagnetic valves for a predetermined period of time immediately after the actuation of the four-way valve.

9. An ice-cream manufacturing apparatus including a plurality of ice-cream manufacturing units, each said manufacturing unit comprising:

a hopper for storing a mix;

a refrigerated cylinder for cooling and beating said mix supplied from said hopper;

an ice-cream discharger provided for each cylinder and one for a pair of said cylinders;

a refrigeration unit associated with a refrigerant circuit for refrigerating the cylinder and hopper of a manufacturing unit during an ice-cream freezing process and for heating said cylinder and said hopper during a pasteurization process;

temperature detection means for detecting the temperatures of said cylinder and said hopper of each said manufacturing unit;

means for heating each cylinder and its hopper during a pasteurization process;

controller means for controlling the operation of each ice-cream manufacturing unit based on the temperatures detected by said temperature detection means by heating for pasteurization and operating said refrigeration unit of a manufacturing unit to cool the cylinder at a preset temperature; said controller means comprising:

timer means for controlling the continuous operation of said refrigeration unit for a predetermined time period to cool the cylinder;

means responsive to a detected temperature above said preset temperature for correcting to a new preset temperature said preset temperature by increasing it at the end of said period;

means for controlling the operation of said refrigeration unit based on said corrected preset temperature; and means for communicating between said plurality of manufacturing units the information regarding the pasteurization process in each manufacturing unit, and for terminating said pasteurization processes only after said heating is completed in both cylinders.

10. The ice-cream manufacturing apparatus as set forth in claim 8, wherein said controller means further comprises:

means for controlling the operation of mix beating means provided in the cylinders and controlling said refrigeration units so as to prepare in the cylinders the mix having desired temperature and softness;

means for detecting the electric current through electric motor means for driving said mix beating means; and means for judging said detected electric current and, based on the judgement, for stopping refrigeration of the refrigeration cylinder without stopping the associated beating means if the current of the associated motor means exceeds a predetermined current level.

11. An ice-cream manufacturing apparatus as set forth in claim 9, further comprising:

pasteurization heating means for pasteurizing said ice-cream manufacturing units by circulating a hot gas or by switching the flow of the refrigerant through said refrigerant circuits;

mix level detectors mounted in each of said hoppers for detecting predetermined levels of the mix therein; and means for indicating that the hopper having a detected mix level below said predetermined level is not ready for pasteurization, and at the same time disabling said pasteurization heating means.

12. An ice-cream manufacturing apparatus having a plurality of ice-cream manufacturing units each having a hopper for storing a mix, at least a pair of refrigerated cylinder for cooling and beating said mix supplied from said hopper; at least one ice-cream discharger provided for each cylinder and one for a pair of said cylinders; at least one refrigeration unit associated with a refrigerant circuit for refrigerating the cylinder and hopper of a manufacturing unit during an ice-cream freezing process and for heating said cylinder and said hopper during a pasteurization process, comprising:

temperature detection means for detecting the temperatures of said cylinders and said hoppers of said manufacturing units;

controller means for controlling the operation of each ice-cream manufacturing unit based on the temperatures detected by said temperature detection means, and for carrying out said heating;

pasteurization heating means for pasteurizing said ice-cream manufacturing units by circulating a hot gas or by switching the flow of the refrigerant through said refrigerant circuits;

means for communicating between said plurality of manufacturing units the information regarding the pasteurization process in each manufacturing unit, and for terminating said pasteurization processes only after said heating is completed in both cylinders;

mix level detectors mounted in each of said hoppers for detecting predetermined levels of the mix therein; and means for indicating that the hopper having a detected mix level below said predetermined level is not ready for pasteurization, and at the same time disabling said pasteurization heating means.

13. An ice-cream manufacturing apparatus having a plurality of ice-cream manufacturing units each having a hopper for storing a mix, at least a pair of refrigerated cylinder for cooling and beating said mix supplied from said hopper; at least one ice-cream discharger provided for each cylinder and one for a pair of said cylinders; at least one refrigeration unit associated with a refrigerant circuit for refrigerating the cylinder and hopper of a manufacturing unit during an ice-cream freezing process and for heating said cylinder and said hopper during a pasteurization process, comprising:

temperature detection means for detecting the temperatures of said cylinders and said hoppers of said manufacturing units;

controller means for controlling the operation of each ice-cream manufacturing unit based on the temperatures detected by said temperature detection means, and for carrying out said heating;

means for communicating between said plurality of manufacturing units the information regarding the pasteurization process in each manufacturing unit, and for terminating said pasteurization processes only after said heating is completed in both cylinders;

wherein said ice-cream manufacturing unit comprises a refrigerant circuit having a compressor, a condenser, and a refrigeration unit mounted on said refrigeration cylinder, said refrigerant circuit further comprising:

a four-way valve for forming a hot gas cycle within said refrigerant circuit;

electromagnetic valves for use in refrigeration operations and electromagnetic valves for use in heating operations in controlling the flow of liquified refrigerant and said hot refrigerant gas, respectively, that flow through said refrigeration cylinder and hopper; and means for opening said electromagnetic valves for a predetermined period of time immediately after the actuation of the four-way valve.

14. An ice-cream manufacturing apparatus comprising: a plurality of ice-cream manufacturing units each having:

a hopper for storing a mix;

at least a pair of refrigerated cylinders for cooling and beating said mix supplied from said hopper;

at least one ice-cream discharger provided for each cylinder and one for a pair of said cylinders;

at least one refrigeration unit associated with a refrigerant circuit for refrigerating the cylinder and hopper of a manufacturing unit during an ice-cream freezing process and for heating said cylinder and said hopper during a pasteurization process by circulating a hot gas or by switching the flow of refrigerant charges said refrigerant circuits;

temperature detection means for detecting the temperatures of said cylinders and said hoppers of said manufacturing units;

controller means for controlling the operation of each ice-cream manufacturing unit based on the temperatures detected by said temperature detection means, and for carrying out said heating wherein said at least one refrigeration unit a manufacturing unit to cools the cylinders at preset temperatures; said controller means further comprising:

timer means for controlling the period of continuous operation of said at least one refrigeration unit to cool the cylinders;

means for correcting said preset temperature at the end of said period;

means for controlling the operation of said at least one refrigeration unit based on said corrected preset temperature;

means for communicating between said plurality of manufacturing units the information regarding the pasteurization process in each manufacturing unit, and for terminating said pasteurization processes only after said heating is completed in both cylinders;

mix level detectors mounted in each of said hoppers for detecting predetermined levels of the mix therein; and means for indicating that the hopper having a detected mix level below said predetermined level is not ready for pasteurization, and at the same time disabling said pasteurization heating means.

* * * * *